(12) United States Patent
Lagsdin

(10) Patent No.: US 6,422,603 B2
(45) Date of Patent: Jul. 23, 2002

(54) STABILIZER PAD FOR VEHICLES

(76) Inventor: Andry Lagsdin, 54 King Hill Rd., Hanover, MA (US) 02339

( * ) Notice: Subject to any disclaimer, the term of this patent is extended or adjusted under 35 U.S.C. 154(b) by 0 days.

(21) Appl. No.: 09/920,148

(22) Filed: Aug. 1, 2001

Related U.S. Application Data

(63) Continuation-in-part of application No. 09/807,712, filed as application No. PCT/US99/25381 on Oct. 28, 1999, which is a continuation-in-part of application No. 09/183,473, filed on Oct. 30, 1998, now Pat. No. 6,270,119.

(51) Int. Cl.⁷ .................................................. B60S 9/02
(52) U.S. Cl. ..................... 280/764.1; 212/304; 248/352
(58) Field of Search ................................ 212/301, 302, 212/304; 248/352, 558, 633; 280/763.1, 764.1, 765.1, 766.1

(56) References Cited

U.S. PATENT DOCUMENTS

| | | |
|---|---|---|
| 2,277,939 A | 3/1942 | Thalhammer |
| 3,219,362 A | 11/1965 | Epstein |
| 3,244,301 A | 4/1966 | Vaughan |
| 3,495,727 A | 2/1970 | Long |
| 3,642,242 A | 2/1972 | Danekas |
| 3,721,458 A | 3/1973 | Mitchell |
| 3,754,777 A | 8/1973 | Riggs et al. |
| 3,831,774 A | 8/1974 | Moore |
| 3,881,692 A | 5/1975 | Clarke |
| 3,897,079 A | 7/1975 | MacKenzie et al. |
| 3,913,942 A | 10/1975 | MacKenzie et al. |
| 3,924,876 A | 12/1975 | Vaillant et al. |
| 3,930,668 A | 1/1976 | Schuerman et al. |
| 3,945,666 A | 3/1976 | Fritsch |
| 3,976,306 A | 8/1976 | Nault |
| 3,990,714 A | 11/1976 | Hornagold |
| 3,998,470 A | 12/1976 | Houston |
| 4,023,828 A | 5/1977 | MacKenzie et al. |
| 4,039,206 A | 8/1977 | Nault |
| 4,073,454 A | 2/1978 | Sauber |
| 4,201,137 A | 5/1980 | Lagsdin |

(List continued on next page.)

FOREIGN PATENT DOCUMENTS

| | | |
|---|---|---|
| CA | 492912 | 5/1953 |
| CA | 1029715 | 4/1978 |
| CA | 1036148 | 8/1978 |

*Primary Examiner*—Michael Mar
(74) *Attorney, Agent, or Firm*—David M. Driscoll

(57) ABSTRACT

The present invention is directed to rotational stabilizer pads for stabilizer arms of vehicles. The stabilizer pads include first and second ground contact faces for contacting respectively a smooth ground surface and a rough or gravel ground surface. In embodiments of the present invention, the stabilizer pads include a reversible resilient pad coupled to a first flange and a second flange. The first and second flanges may include grouser points for engaging the rough ground surface. In embodiments of the present invention. The stabilizer pads are rotated about 135 degrees to change the ground contact face of the stabilizer pad from one of the first and second ground contact faces to the other.

44 Claims, 30 Drawing Sheets

U.S. PATENT DOCUMENTS

| | | |
|---|---|---|
| 4,204,714 A | 5/1980 | Jocobson et al. |
| 4,266,809 A | 5/1981 | Wuerflein |
| 4,397,479 A | 8/1983 | Schmidt |
| 4,473,239 A | 9/1984 | Smart |
| 4,515,520 A | 5/1985 | Parquet et al. |
| 4,531,883 A | 7/1985 | Arnold |
| 4,546,996 A | 10/1985 | Hanson |
| 4,619,369 A | 10/1986 | Mertens |
| 4,761,021 A | 8/1988 | Lagsdin |
| 4,860,539 A | 8/1989 | Parrett et al. |
| 4,889,362 A | 12/1989 | Lagsdin |
| 5,011,184 A | 4/1991 | Loudon |
| 5,015,008 A | 5/1991 | Schupback |
| 5,050,904 A | 9/1991 | Lagsdin |
| 5,051,057 A | 9/1991 | Kremer |
| 5,054,812 A | 10/1991 | Lagsdin |
| 5,310,217 A | 5/1994 | Paskey et al. |
| 5,338,255 A | 8/1994 | Akehurst |
| 5,466,004 A | 11/1995 | Lagsdin |
| 5,488,788 A | 2/1996 | Durbin |
| 5,547,220 A | 8/1996 | Lagsdin |
| 5,564,871 A | 10/1996 | Lagsdin |
| 5,667,245 A | 9/1997 | Lagsdin |
| 5,730,455 A | 3/1998 | Varnum, Sr. et al. |
| 5,957,496 A | 9/1999 | Lagsdin |
| 5,992,883 A | 11/1999 | Lagsdin |
| 6,109,650 A | 8/2000 | Lagsdin |

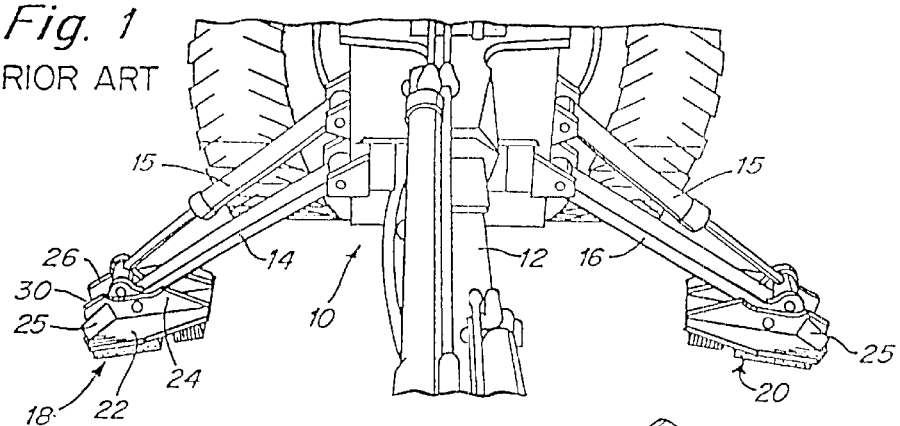
Fig. 1
PRIOR ART
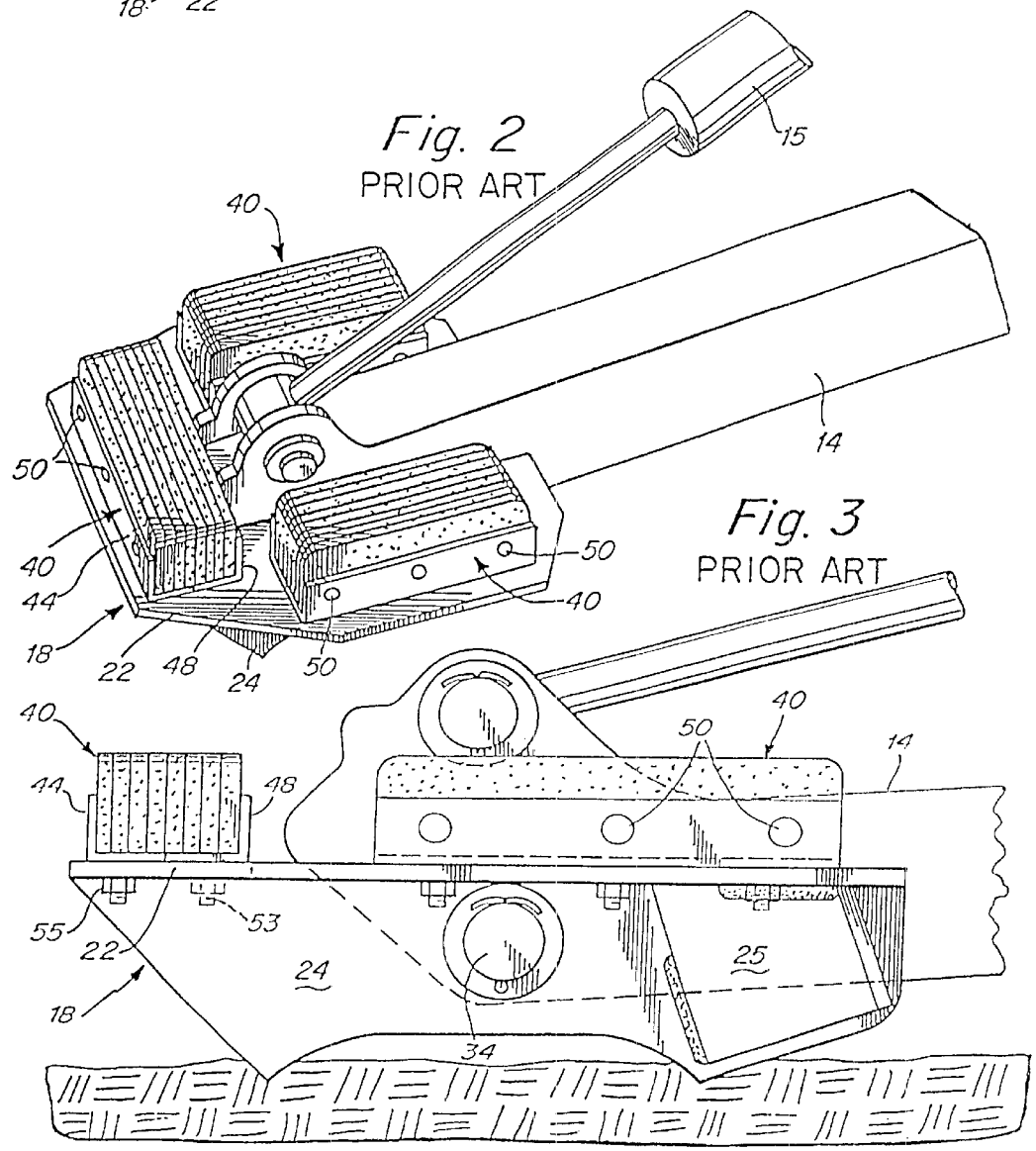
Fig. 2
PRIOR ART
Fig. 3
PRIOR ART

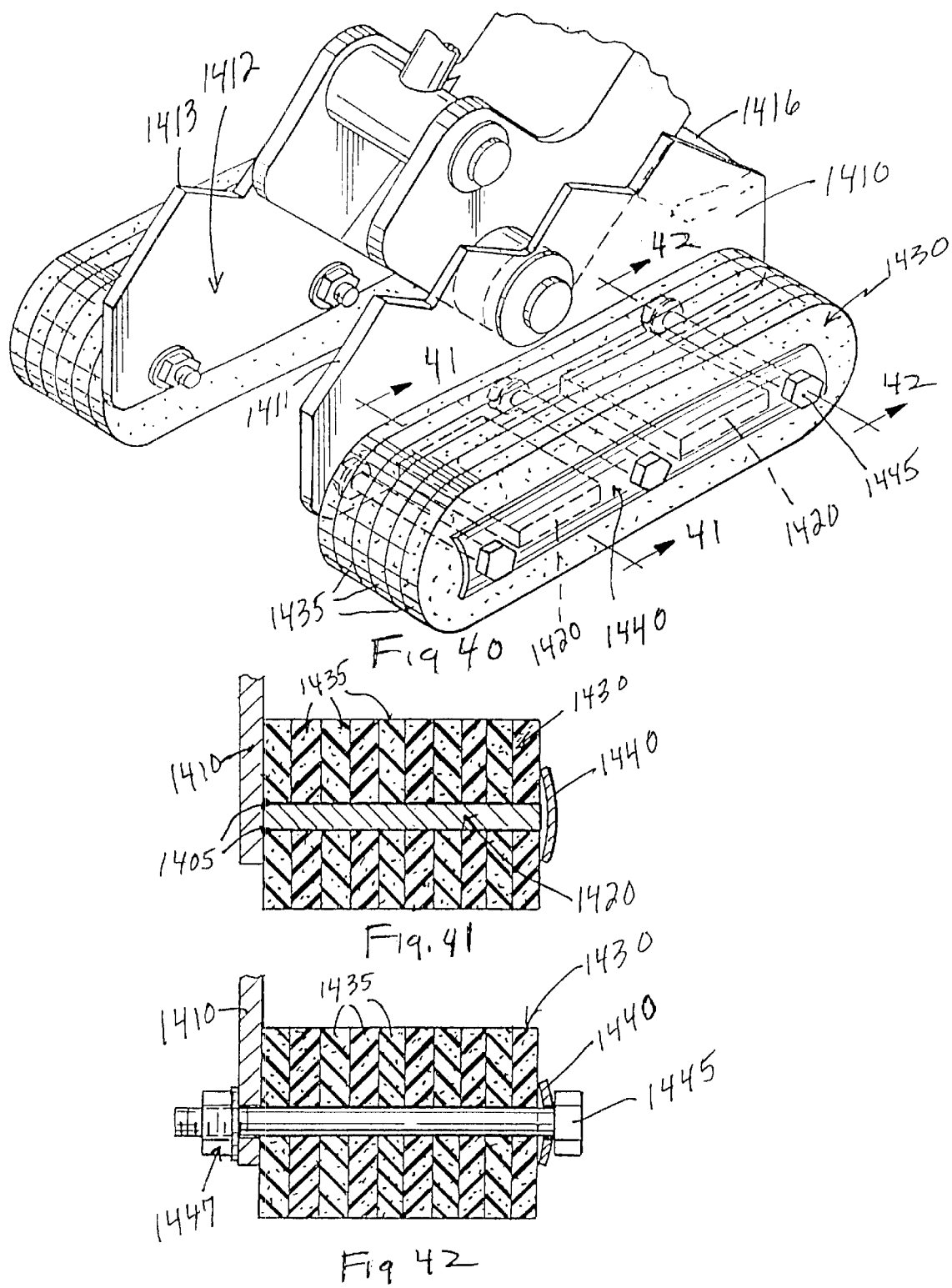

STABILIZER PAD FOR VEHICLES

RELATED APPLICATIONS

This application is a continuation-in-part of U.S. application Ser. No. 09/807,712 filed Apr. 17, 2001. This application also claims the benefit under 35 U.S.C. §120 or 35 U.S.C. §365(c) of PCT International application PCT/US99/25381, designating the United States of America, and filed Oct. 28, 1999. PCT application PCT/US99/25381, of which U.S. application Ser. No. 09/807,712 is a national stage filing under 35 U.S.C. §371, was published under PCT Article 21(2) in English. PCT/US99/25381 is a continuation-in-part of U.S. application Ser. No. 09/183,473, filed Oct. 30, 1998, now U.S. Pat. No. 6,270,119.

FIELD OF THE INVENTION

The present invention relates generally to stabilizer pads for vehicles, and more specifically to pivotally mounted, reversible stabilizer pads having a generally flanged first surface for engagement with a soft irregular ground surface such as gravel and having a resilient second surface for engagement with a smooth hard ground surface such as concrete or asphalt.

BACKGROUND OF THE INVENTION

FIG. 1 is a fragmentary view of a typical loader/backhoe 10 having a shovel mechanism 12, stabilizer arms 14 and 16, and associated stabilizer pads 18 and 20, respectfully. Hydraulic pistons 15 are used to operate each of the stabilizer arms 14 and 16 independently. In FIG. 1, the stabilizer arms are in an operational, extended position with the stabilizer pads 18 and 20 in engagement with the ground surface to prevent movement of the backhoe during operation of the shovel mechanism 12. When the backhoe 10 is to be moved, the pistons associated with each cylinder are withdrawn so that the stabilizer arms 14 and 16 pivot and raise the stabilizer pads above ground level.

The stabilizer pad 18 of FIG. 1 is shown in greater detail in FIGS. 2 and 3. Stabilizer pad 20 is substantially identical to stabilizer pad 18. The stabilizer pad 18 and similar stabilizer pads are further described in U.S. Pat. Nos. 4,889,362, 5,054,812, 5,466,004, 5,547,220 and 5,667,245, each of which is issued to the inventor of the present application and incorporated herein by reference. The stabilizer pad 18 includes a flat plate 22 having flanges 24 and 26, both extending from one surface of plate 22. The stabilizer pad 18 is also provided with supporting webs or ribs 25, one associated with each flange. The ribs 25 provide additional support for the flanges 24 and 26. The plate 22 is notched at 30 between flanges 24 and 26 as illustrated in FIG. 1. The plate is notched to accommodate the arm 14 and to enable reversible rotation of the stabilizer pad.

The stabilizer arm 14 includes a journal end for accommodating pin 34. Pin 34 also fits within holes of flanges 24 and 26. The pin is used to secure the stabilizer pad to the arm using, for example, a cotter pin as illustrated in FIG. 3.

On the side of the flat plate 22 opposite that containing the flanges 24 and 26 are disposed three laminated rubber pads 40. Each of the rubber pads 40 includes laminated rubber sections supported between angle irons 44 and 48. The angle irons 44 and 48 have a base leg and an upright leg. Each of the upright legs has holes therein for receiving elongated securing pins 50 for containing the laminated rubber sections between the angle irons. The laminated pads 40 are secured to the plate 22 using bolts 53 and nuts 55.

The stabilizer pads 18 and 20 are rotatable about pin 34 when the stabilizer arms are in the raised position to place either the rubber pads 40 downward for engagement with the ground or to place the flanges 24 and 26 downward for engagement with the ground.

In typical operation, the rubber pad side of the stabilizer pad 18 is positioned to engage the ground, as shown in FIG. 1, when the ground surface is a relatively flat hard surface such as concrete or pavement. The flange side of the stabilizer pad 18, as shown in FIG. 2, is positioned to engage the ground when the ground surface is an unfinished ground surface, such as gravel or dirt. The flanges are designed to dig into the unfinished ground surface to anchor and stabilize the backhoe.

Although the prior art, reversible stabilizer pads described above provide reliable operation, it is desirable to provide a simplified stabilizer pad with improved operational performance over the stabilizer pads described above.

SUMMARY OF THE INVENTION

In one general aspect, the invention features a stabilizer pad for use with a stabilizer arm. The stabilizer pad includes a frame having a base plate and first and second flanges extending from a first surface of the base plate. Each of the first flange and the second flange has at least one grouser point to engage a ground surface. The frame, including the base plate, the first flange and the second flange, is formed using a continuous, substantially U-shaped piece of material. The stabilizer pad further includes a resilient pad mounted to a second surface of the base plate, opposite the first surface of the base plate.

The resilient pad can be constructed and arranged such that it covers substantially all of the second surface of the base plate, and the resilient pad can include a plurality of rubber strips. The stabilizer arm can include a pin for rotatably mounting the stabilizer pad to the stabilizer arm, and each of the first and second flanges can include a mounting hole to receive the pin. The resilient pad can be a reversible resilient pad having a first substantially smooth surface to engage a ground surface, and a second substantially smooth surface to engage a ground surface, the first surface being substantially parallel to the second surface. The stabilizer pad can further include a mounting bracket that is constructed and arranged to mount the resilient pad to the frame such that either the first surface of the resilient pad or the second surface of the resilient pad is in contact with the second surface of the base plate. Each of the flanges can have a pair of grouser points to engage a ground surface, and for each pair of grouser points, a first grouser point of the pair can extend a greater distance from the base plate than a second grouser point of the pair. The stabilizer pad can further include means for preventing inadvertent rotation of the stabilizer pad about the pin.

In another general aspect, the invention features a stabilizer pad for pivotally coupling to a stabilizer arm of a vehicle such that the stabilizer pad can rotate about a rotation axis to allow either a first ground contact face of the stabilizer pad or a second ground contact face of the stabilizer pad to engage a ground surface. The stabilizer pad includes a frame having a base plate, a first flange and a second flange, the base plate having a first surface and a second surface, the first and second flanges being coupled to the base plate and extending in a direction substantially perpendicular to the first surface of the base plate. The stabilizer pad further includes a resilient pad mounted to the base plate, the resilient pad extending over substantially all of the second surface of the base plate.

The resilient pad can include a plurality of rubber strips. The stabilizer arm can include a pin for mounting the stabilizer pad to the stabilizer arm, and each of the first and second flanges can include a mounting hole to receive the pin. The resilient pad can be reversible and have a first substantially smooth surface to engage a ground surface, and a second substantially smooth surface to engage the ground surface, the first surface being substantially parallel to the second surface. The stabilizer pad can further include a mounting bracket that is constructed and arranged to mount the resilient pad to the frame such that either the first surface of the resilient pad or the second surface of the resilient pad is in contact with the second surface of the base plate. Each of the flanges of the stabilizer pad can have a pair of grouser points to engage a ground surface, and for each pair of grouser points, a first grouser point of the pair can extend a greater distance from the base plate than a second grouser point of the pair. The stabilizer pad can further include means for preventing inadvertent rotation of the stabilizer pad about the pin. The resilient pad can be formed using at least one rubber strip having a slot formed therein, and the base plate can extend through the slot in the rubber strip.

In yet another general aspect, the present invention features a rotatable stabilizer pad for use with a stabilizer arm. The rotatable stabilizer pad includes a base plate having a first surface and a second surface, the second surface being substantially parallel to the first surface, and first and second flanges, coupled to the base plate and extending from one surface of the base plate. Each of the flanges has a pair of grouser points to engage a ground surface, and for each pair of grouser points, a first grouser point of the pair extends a greater distance from the base plate than a second grouser point of the pair. The stabilizer pad can further include a resilient pad mounted to the base plate, and the resilient pad can have an engaging surface to engage a ground surface, the engaging surface being substantially parallel to the second surface of the base plate.

In another general aspect, the invention features a reversible resilient pad for a stabilizer pad of a stabilizer arm. The resilient pad includes a resilient body portion having a first substantially smooth surface to engage a ground surface, and a second substantially smooth surface to engage a ground surface, and means for coupling the resilient body portion to the stabilizer pad such that either the first surface or the second surface can be selected as a contact surface and be positioned to contact the ground surface. The resilient body portion can include a plurality of rubber strips.

In another general aspect, the invention features a reversible resilient pad for a stabilizer pad of a stabilizer arm. The reversible resilient pad includes a resilient body portion having a first substantially smooth surface to engage a ground surface, and a second substantially smooth surface to engage a ground surface, the first surface being substantially parallel to the second surface. The reversible resilient pad further includes at least one mounting bracket coupled to the resilient body portion for coupling the resilient body portion to the stabilizer pad.

The at least one mounting bracket can include a first bracket mounted to a first side of the body portion between the first surface and the second surface, and a second bracket mounted to a second side of the body portion between the first surface and the second surface. The first bracket and the second bracket can be constructed and arranged to provide reversible mounting of the resilient pad to the stabilizer arm to allow either the first substantially smooth surface or the second substantially smooth surface to contact a ground surface.

In another general aspect, the invention features a stabilizer pad for a stabilizer arm of a vehicle. The stabilizer pad includes means for pivotally coupling the stabilizer pad to the stabilizer arm of the vehicle such that the stabilizer pad can rotate about a rotation axis to allow either a first ground contact face of the stabilizer pad or a second ground contact face of the stabilizer pad to engage a ground surface, a first flange and a second flange, each of which is coupled to the means for pivotally coupling, a resilient pad, and means for coupling the resilient pad to the first flange and the second flange.

The resilient pad can be a reversible resilient pad having a first substantially smooth surface to engage the ground surface, and a second substantially smooth surface to engage the ground surface, the first surface being substantially parallel to the second surface. The means for coupling can include means for arranging the reversible resilient pad such that either the first surface of the resilient pad or the second surface of the resilient pad is positioned to contact the ground surface. Each of the flanges can have a pair of grouser points to engage a ground surface. The means for pivotally coupling can allow rotation of the stabilizer pad such that either the grouser points or the resilient pad is positioned to engage the ground surface. The stabilizer pad can further include means for preventing inadvertent rotation of the stabilizer pad about the axis of rotation.

In another aspect of the present invention there is provided a stabilizer pad for use with a stabilizer arm. The stabilizer pad comprises a frame of multiple members including a first member defining a first ground contact surface extending generally along a first plane, and a second member having a surface extending generally along a second plane. The first and second planes are arranged in a non-parallel relative position. A resilient pad is provided and mounted to the second member surface and defines a second ground contact surface different than said first ground contact surface. The first and second ground contact surfaces are also arranged in a non-parallel relative position. The first member comprises at least a first flange and the second member comprises a base plate. The resilient pad has a first substantially flat surface to engage a ground surface and a second substantially flat surface to engage a ground surface. The first substantially flat surface is substantially parallel to the second flat surface. The pad also includes means for coupling the resilient pad to the frame so that either the first surface or the second surface can be selected as a contact surface and be positioned to contact the ground surface.

In accordance with still a further aspect of the present invention there is provided, in a stabilizer pad for use with a stabilizer arm, an improved resilient pad member that is comprised of a resilient body portion having a first ground engageable surface extending generally along a first plane, and a second ground engageable surface extending generally along a second plane. The first and second planes are spaced from each other and disposed substantially in parallel relative position. Means are provided for coupling the resilient body portion to the stabilizer pad such that one of the first and second ground engageable surfaces can be selected and be positioned to contact the ground surface while the other of the first and second ground engageable surfaces is disposed spaced above and substantially in parallel to the ground surface. The means for coupling enables either, but only one at a time, of the ground engageable surfaces to be in contact with the ground surface. The resilient body portion may include a plurality of rubber strips.

In accordance with still a further aspect of the present invention there is provided a stabilizer pad for use with a stabilizer arm. The pad comprises a support piece and means for pivotally retaining the support piece from the stabilizer arm. The resilient pad has at least one upstanding portion engageable with a slot in the support piece. Retaining means are provided for securing the resilient pad to the support piece. The support piece may include an upright flange and a base piece having multiple slots for receiving multiple upstanding portions of the resilient pad.

In accordance with another aspect of the present invention there is provided a stabilizer pad for use with a stabilizer arm. The pad comprises a support piece and means for pivotally retaining the support piece from the stabilizer arm. A resilient pad is provided having at least one slot therethrough and defining first and second opposed ground engaging surfaces. The support piece has at least one base support member engaging the slot for support of the resilient pad from the support piece with one of said ground engaging surfaces disposed in a ground engaging position. The support piece may actually comprise a pair of base support pieces engaging with a corresponding pair of slots in the resilient pad. In this particular aspect of the invention the resilient pad is reversible by removing retaining means and reversing the pad through a 180° rotation. A circular or hexagonal shape could be revolved in smaller degrees of rotation such as 30°, 45° etc and then secured also.

In accordance with a further aspect of the present invention there is provided a stabilizer pad that comprises a support piece and a resilient pad supported from the support piece. The support piece has a cam and there is also provide a releasable resilient latch supported from the stabilizer arm and adapted to engage the cam to hold the latch in a locked position. The latch is constructed of a resilient material and manually operable so as to move to an unlocked position, disengaging from the cam to permit rotation of the pad. The releasable latch is preferably held in a locked position while grouser points of the pad are in engagement with a ground surface.

In accordance with a further aspect of the present invention there is provided a stabilizer pad assembly that is comprised of a pair of laterally spaced apart plate members with the plate members being pivotally attached to a stabilizer arm by a pin extending laterally between spaced surfaces of respective plate members. At least one resilient pad is formed with multiple peripheral surfaces and with at least one passage extending transversely therethrough between opposite sides thereof. At least one mounting member is provided extending through the passage in the resilient pad. The mounting member has at least one end portion secured to at least one of the plate members so as to support the resilient pad from that plate member. A fastener is engageable between the resilient pad and the plate member. This fastener is removable to permit the resilient pad to be rotatable between the multiple peripheral surfaces and to be re-engagable so as to permit selective positioning of any one of the multiple peripheral surfaces for use as a working surface for ground engagement.

In accordance with further aspects of the present invention there may be a plurality of separate resilient pads and a like plurality of mounting members. The mounting members may position the resilient pads with opposite ends thereof disposed between the pair of plate members. The mounting members preferably position the resilient pads spaced from one another. The mounting member may comprise a shaft. The resilient pads may be of cylindrical shape with the mounting member extending through a passage at substantially the center axis of the cylindrical resilient pad. The cylindrical pad may have multiple, peripherally-disposed, through holes corresponding in number to the number of multiple peripheral surfaces and for receiving the fastener extending through a selected one of the holes between plate members to position one of the multiple surfaces for use as the working surface.

In accordance with further aspects of the present invention the mounting member may be in the form of a bolt and the fastener may also be in the form of a bolt. Each resilient pad may be of multi-sided, cross-section including, for example, a square cross-section or a triangular cross-section. Each of the resilient pads may be of single piece construction or may be comprised of multiple stacked pad segments. There may be provided a base wall interconnecting the spaced apart plate members and disposed between the pin and the resilient pad. The base wall and parts of the plate members form a pocket for receiving multiple resilient pads. The plate members may also have grouser points.

In accordance with still further versions, the pad may comprise a pair of laterally spaced apart plate members with the pair of plate members being pivotally attached to a stabilizer arm by a pin extending laterally between facing surfaces of the respective plate members. At least one resilient pad is provided formed with multiple peripheral surfaces, and with at least one passage extending transversely therethrough between opposite sides of resilient pad. At least one mounting member is provided extending through the passage in the resilient pad. The resilient pad passage and mounting member have like non-circular cross-sections. A fastener removeably engageable with the mounting member is removable to permit the resilient pad to be rotatable between the multiple peripheral surfaces and re-engagable so as to permit selective positioning of any one of the multiple peripheral surfaces for use as a working surface for ground engagement.

In accordance with further aspects of the invention, there may be provided a plurality of separate resilient pads and a like plurality of mounting members. The mounting members may position the resilient pads with opposite ends thereof disposed between the pair of plate members. The mounting members may position the resilient pads spaced from one another. The mounting member may comprise a shaft that extends between spaced apart plate members. The shaft is of multi-sided cross-section and may be, for example, triangular or square in cross-section. The combination of the passage in the pad as well as the configuration of the shaft provides indexing for the pad supported from the plate members.

In accordance with still a further version of the present invention there is provided a stabilizer pad assembly that comprises a pair of laterally spaced apart plate members, a pin extending between the plate members for providing pivotal support of the plate members from a stabilizer arm and a resilient pad formed with upper and low substantially planar surfaces, and with at least one passage extending transversely therethrough between opposite sides thereof. At least one mounting member extends through the passage in the pad and is fixedly supported from at least one of the pair of plate members. A clamp bar is spacedly disposed from one of the plate members and arranged on the side of that plate member opposite to the other plate member. The clamp bar is for retaining one side of the resilient pad. At least one securing piece is provided extending through the clamp bar and the resilient pad and for securing the resilient pad to the one plate member with the resilient pad retained between the clamp bar and the one plate member.

In accordance with still further versions of the present invention the clamp bar may have a curved cross-section so that when it is clamped it provides a vice action on the resilient pad. There may be a pair of mounting members. The securing piece may comprise at least one bolt that is for securing the resilient pad to the one plate member. There may also be provided another resilient pad, clamp bar, and pair of mounting members for securing the other resilient pad to the other plate member, whereby both resilient pads are on the outside of the respective plate members.

BRIEF DESCRIPTION OF THE DRAWINGS

For a better understanding of the present invention, reference is made to the drawings which are incorporated herein by reference and in which:

FIG. 1 is a fragmentary view of a typical loader/backhoe having a stabilizer arm with stabilizer pads of the prior art secured thereto;

FIG. 2 is a perspective view of the stabilizer pad and arm of FIG. 1 in a gravel or dirt engaging position;

FIG. 3 is a side elevational view of the stabilizer pad and arm construction in the position of FIG. 2;

FIG. 40 is a perspective view of a further version of the present invention;

FIG. 41 is a cross-sectional view of the version of the invention illustrated in FIG. 40 as taken along line 41—41 of FIG. 40;

FIG. 42 is a cross-sectional view of the version of the invention illustrated in FIG. 40, as taken along line 42—42 of FIG. 40;

DETAILED DESCRIPTION

Figure 4:
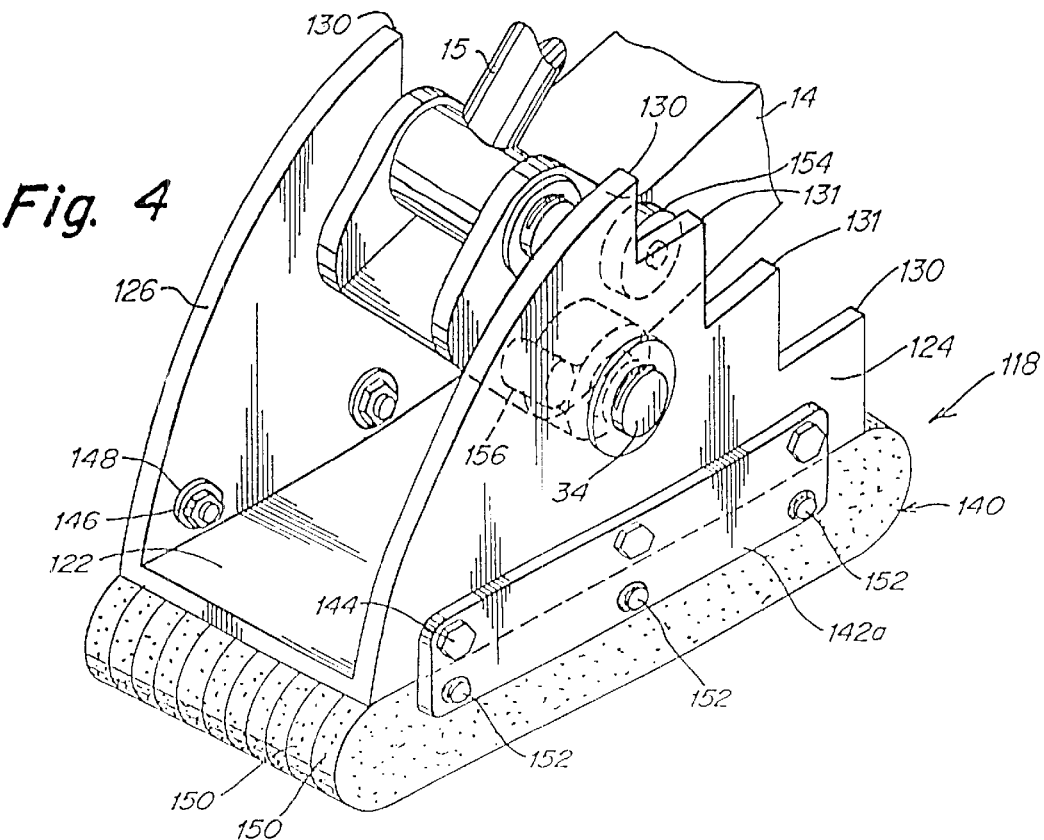
FIG. 4 is a perspective view of a first embodiment of a stabilizer pad of the present invention in a position for engaging a smooth surface.

A preferred embodiment of a stabilizer pad 118 in accordance with the present invention will now be described with reference to FIGS. 4–10. As understood by those skilled in the art, stabilizer pads in accordance with embodiments of the present invention may be used with a backhoe as shown in FIG. 1, and may also be used with other vehicles or platforms having stabilizing members for stabilizing the vehicle or platform.

The stabilizer pad 118 has a substantially U-shaped frame formed in one embodiment from a continuous steel sheet. The continuous steel sheet is bent to form the U-shape consisting of a base plate 122 and flanges 124 and 126. Each of the flanges 124 and 126 has outer grouser points 130 and inner grouser points 131.

Figure 10:
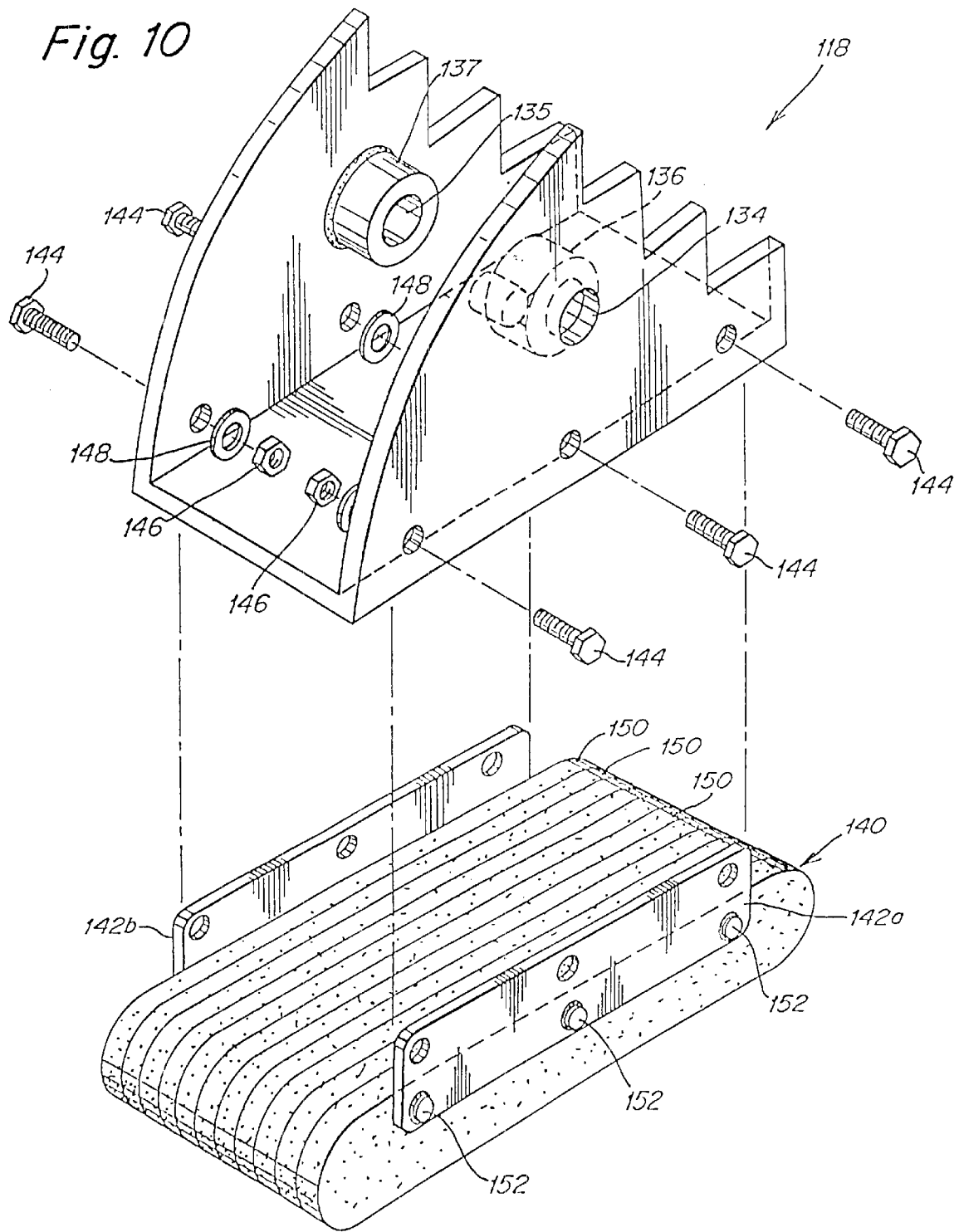
FIG. 10 is an exploded perspective view of the stabilizer pad of FIG. 4 in the position for engaging a smooth surface.

Mounted to the underside of the base plate 122 is a resilient pad 140. The resilient pad 140 is secured to the frame using brackets 142a and 142b which respectfully couple to flanges 124 and 126. The brackets are mounted to the flanges using bolts 144, nuts 146 and washers 148, as best shown in FIG. 10.

The resilient pad 140 is formed using a plurality of rubber strips 150 that are compressed using brackets 142a and 142b and steel rods 152. In the embodiment shown, the steel rods 152 are welded to each of the brackets 142a and 142b, however, in other embodiments, the steel rods can be replaced by bolts and nuts. In one embodiment of the present invention. The rubber strips are made from sidewall segments of truck tire carcasses or from rubber conveyor belts, both of which have been found to provide desirable flexibility and surface friction for use in stabilizer pads.

Each of the flanges 124 and 126 has a hole, respectfully 134 and 135 in alignment with bushings 136 and 137. The holes and bushings are designed to accommodate the pin 34 of the stabilizer arm 14 to couple the stabilizer arm to the stabilizer pad as in the prior art.

The stabilizer pad 118 includes an optional cam 156 mounted to bushing 136. In addition, the stabilizer arm 14 includes a polyethylene wheel 154 mounted to the side of the stabilizer arm as shown in FIG. 4, using a bolt and a nut. In one embodiment, the cam is made from a steel rod and is welded to the bushing, however, in other embodiments, the cam may be made from other relatively hard materials and fastened to the arm using other techniques. The polyethylene wheel and cam prevent inadvertent flipping of the stabilizer pad as described further below and as described in U.S. patent application Ser. No. 08/909,524, which is incorporated herein by reference. Other mechanisms for preventing self-flipping, such as those described in U.S. Pat. Nos. 5,054,812 and 5,667,245, may also be used with stabilizer pads of the present invention.

Figure 5:
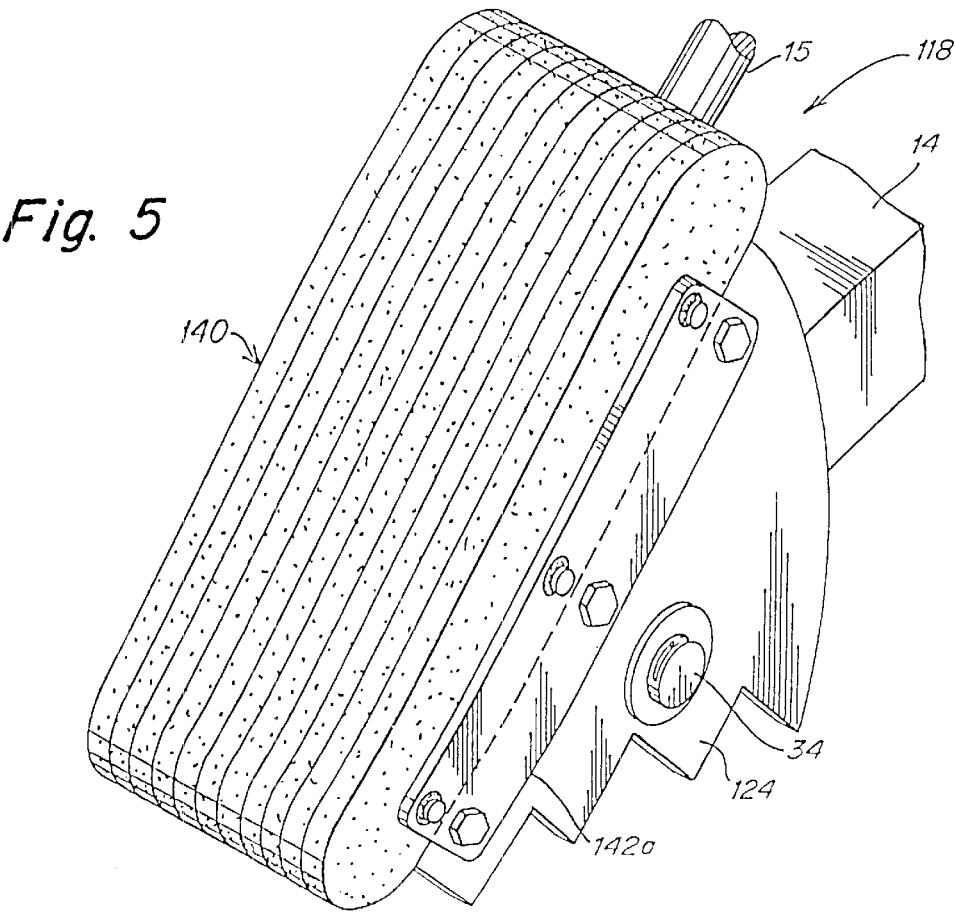
FIG. 5 is a perspective view of the embodiment of FIG. 4 with the stabilizer pad in a position for engaging a gravel or dirt ground surface.
Figure 6:
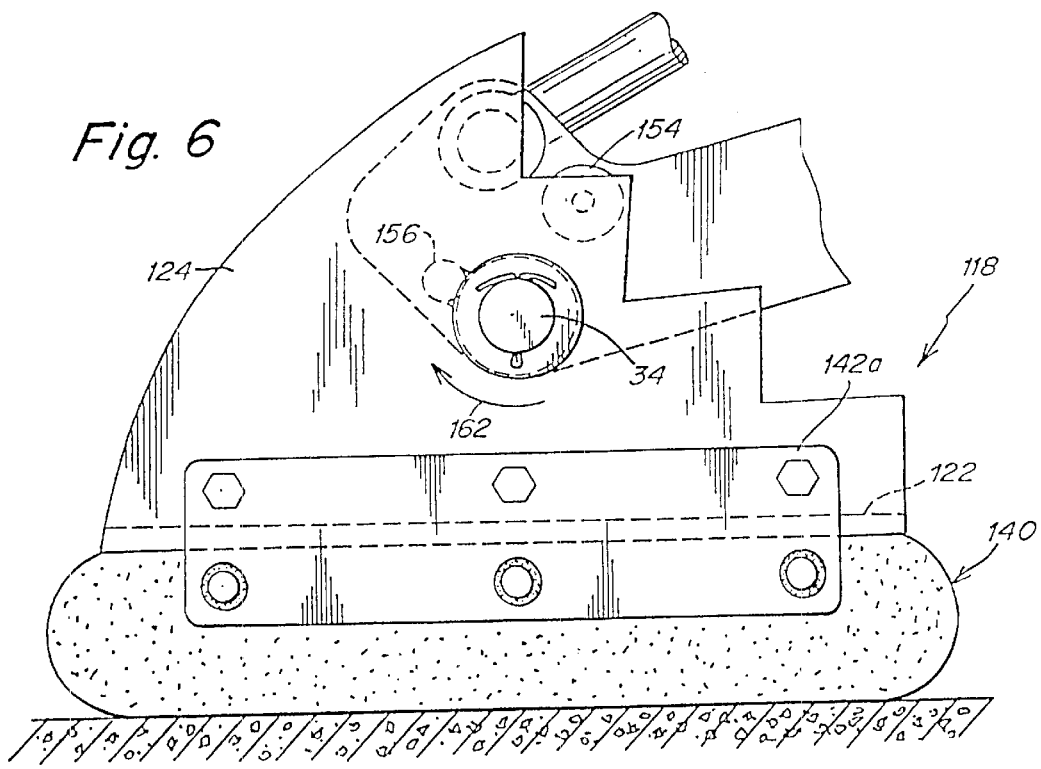
FIG. 6 is a side view of the stabilizer pad of FIG. 4 with the stabilizer pad in the position for engaging a smooth surface.

Stabilizer pad 118 is rotatable about pin 34 when the stabilizer arm is in its upright position to place either the resilient pad 140 or the grouser points 130 downward to engage the ground when the stabilizer arms are lowered to stabilize the vehicle. When the vehicle is operated on a smooth, finished ground surface, it is desirable to place the resilient pad 140 of the stabilizer pad 118 in contact with the ground surface. When the vehicle is operated on a rough or unfinished ground surface, it is desirable to position the stabilizer pad such that the outer grouser points 130, and in some instances the inner grouser points 131, contact the ground surface. FIGS. 4 and 6 show the stabilizer pad with the resilient pad 140 in position to engage the ground surface, while FIGS. 5 and 7 show the stabilizer pad with the outer grouser points 130 in position to engage the ground surface.

Figure 7:
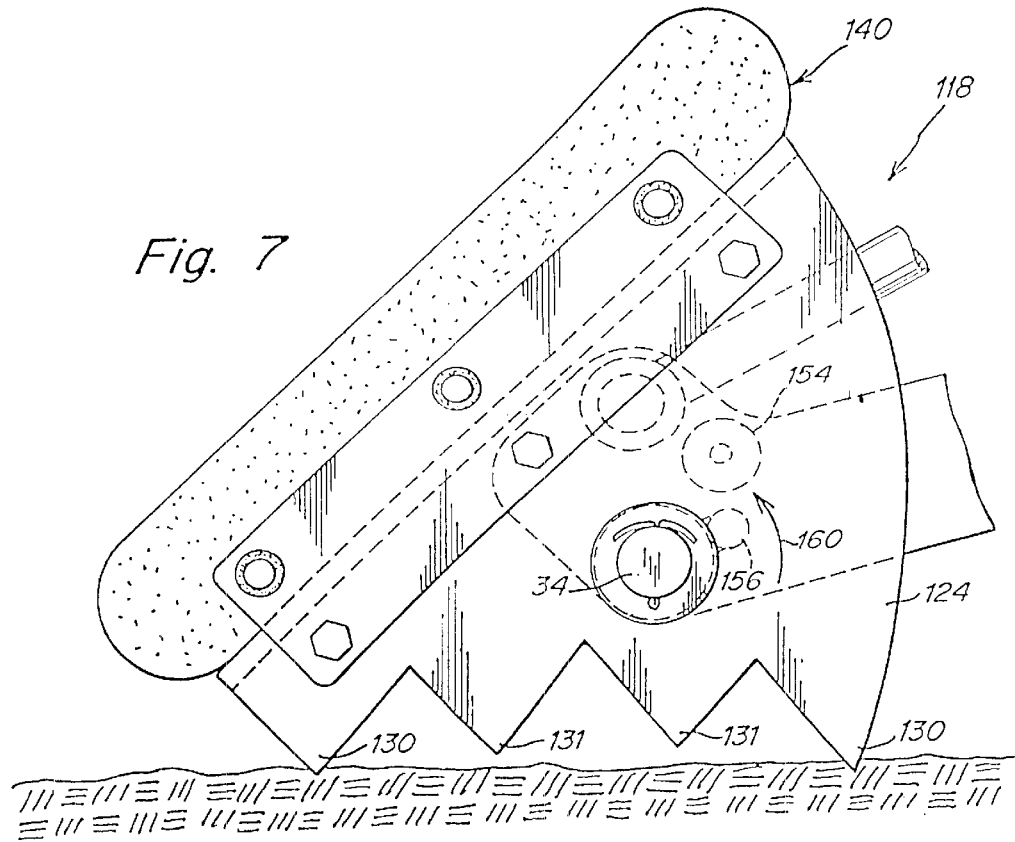
FIG. 7 is a side view of the stabilizer pad of FIG. 4 with the stabilizer pad in the position for engaging a gravel or dirt ground surface.
Figure 8:
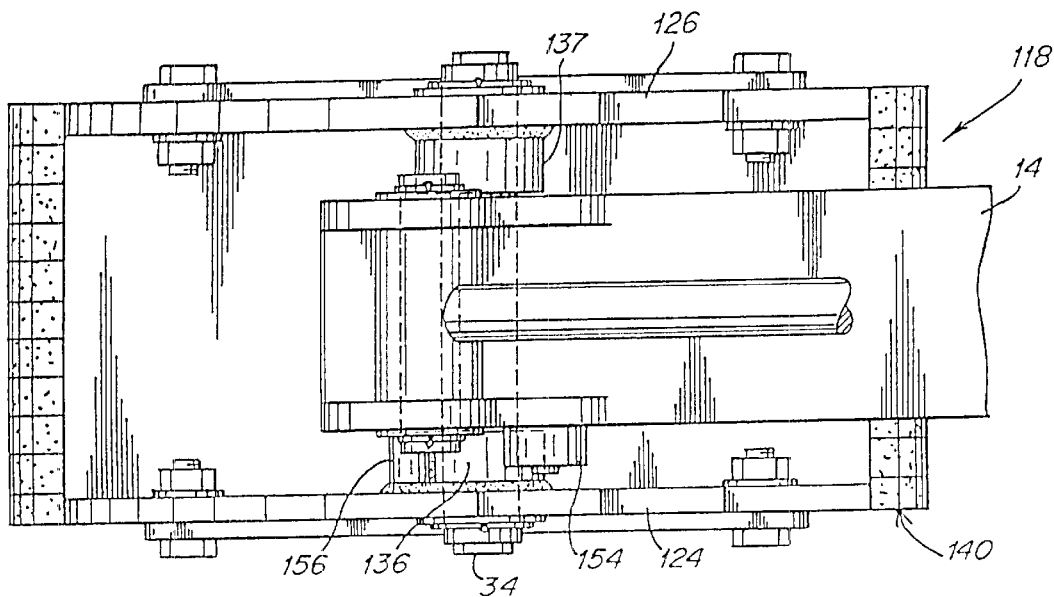
FIG. 8 is a top view of the stabilizer pad of FIG. 4 with the stabilizer pad in the position for engaging a smooth surface.
Figure 9:
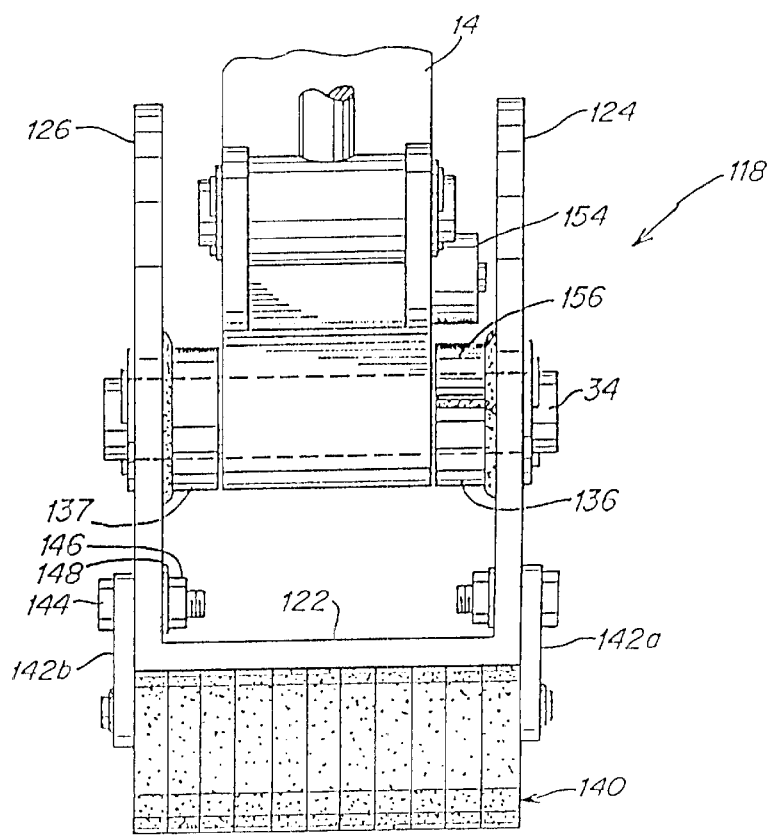
FIG. 9 is a front view of the stabilizer pad of FIG. 4 with the stabilizer pad in the position for engaging a smooth surface.

As shown in FIG. 7, the outer grouser points 130 are slightly longer than the inner grouser points 131 allowing the outer grouser points to contact the ground surface to provide maximum stability. On particularly rough or uneven surfaces, the inner grouser points may also contact the ground surface. In other embodiments of the present invention, the stabilizer pad 1 18 may not include the inner grouser points.

As briefly discussed above, the polyethylene wheel 154 and cam 156 are used to prevent the stabilizer pad 118 from inadvertently flipping when the stabilizer arm is raised. The weight of the resilient pad 140 may cause the stabilizer pad to flip from the position shown in FIG. 7 to that shown in FIG. 6 by rotating in the direction of arrow 160 when the stabilizer arm is raised. When the stabilizer pad rotates in the direction shown by arrow 160, the cam 156 contacts the wheel 154 and prevents further rotation of the stabilizer pad. When it is desired to flip the stabilizer pad from the position shown in FIG. 7 to that shown in FIG. 6, additional rotational force can be applied to the stabilizer pad by an operator of the vehicle to cause the polyethylene wheel 154 to deform slightly and allow the cam to pass by the polyethylene wheel.

To rotate the stabilizer pad from the position shown in FIG. 6 to that shown in FIG. 7, the stabilizer pad is rotated approximately 135° about the pin 34 in the direction shown by arrow 162 (see FIG. 6). Similarly, to move from the position shown in FIG. 7 to that shown in FIG. 6, the stabilizer pad 118 is rotated approximately 135° about pin 34 in the direction shown by arrow 160.

Figure 11:
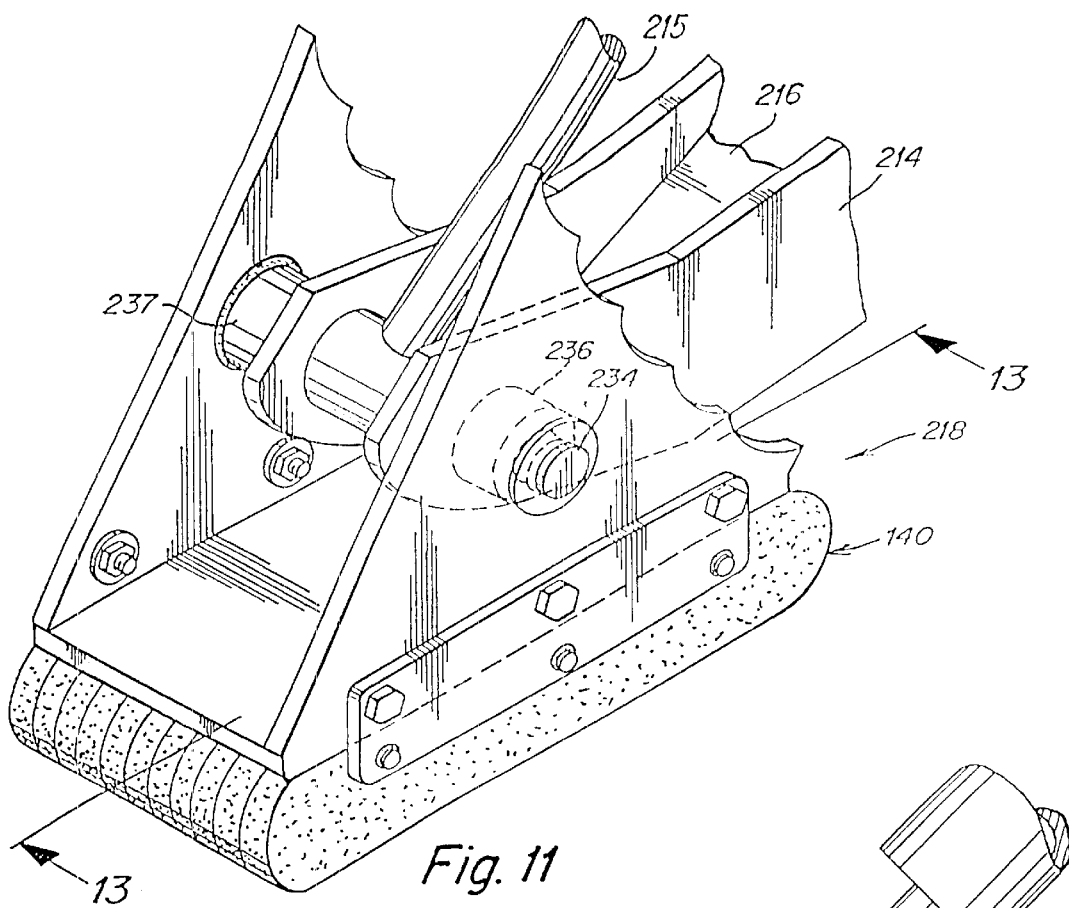
FIG. 11 is a perspective view of a second embodiment of a stabilizer pad with the stabilizer pad in the position for engaging a smooth surface.
Figure 12:
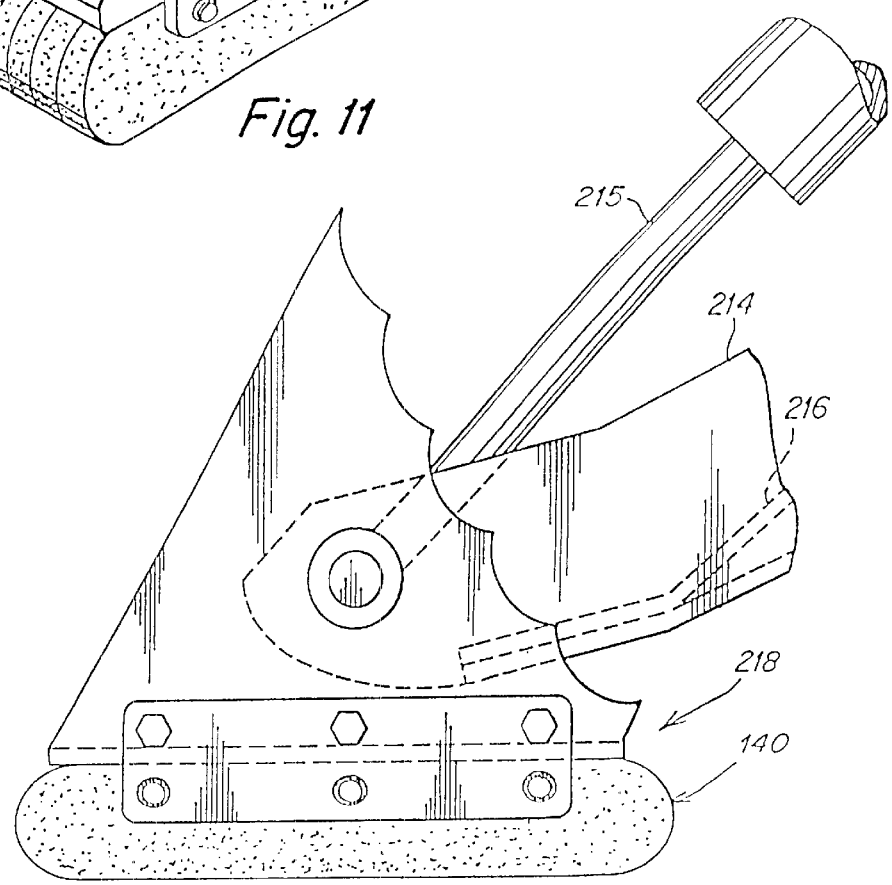
FIG. 12 is a side view of the stabilizer pad of FIG. 11.
Figure 13:
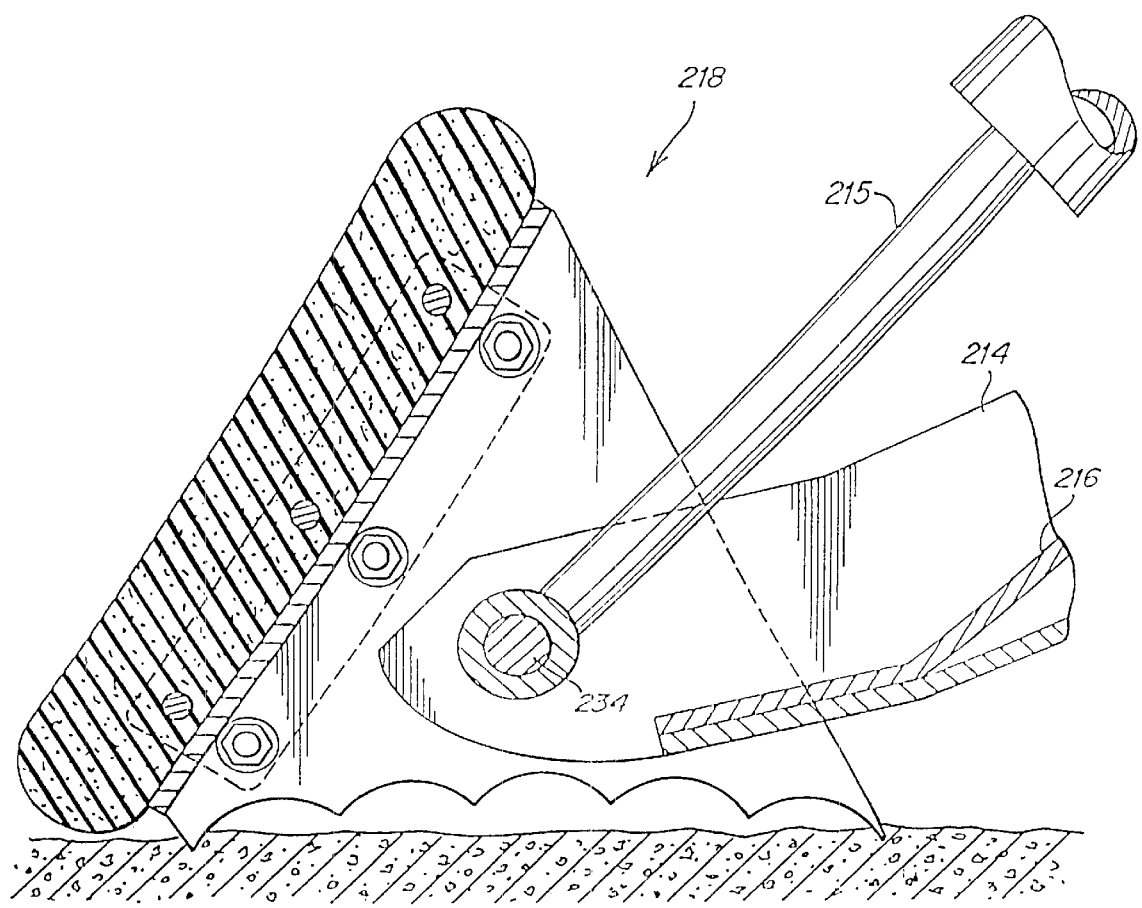
FIG. 13 is a cross-sectional side view taken along line 13—13 of FIG. 11 with the stabilizer pad in the position for engaging a dirt or gravel surface.

A second embodiment of a stabilizer pad 218 in accordance with the present invention will now be described with reference to FIGS. 11–13, which show the stabilizer pad 218 mounted to a stabilizer arm 214. Stabilizer arm 214 differs from stabilizer arm 14 in that it includes only one pin 234 for coupling to both a hydraulic piston 215 and to the stabilizer pad 218. In addition, the stabilizer arm 214 includes a steel plate 216 contained within the stabilizer arm to provide rigidity to the stabilizer arm. Stabilizer pad 218 is similar to stabilizer pad 118, and similar components are labeled using the same reference numbers. Stabilizer pad 218 differs from stabilizer pad 18 in that the bushings 236 and 237 used to mount the stabilizer pad 218 to the stabilizer arm 214 are sized to accommodate the pin 234.

A third embodiment of a stabilizer pad 318 for use on the stabilizer arm 14 will now be described with reference to FIGS. 14–16. The third embodiment includes flange pieces 324 and 326 and a resilient pad 340. The flanges 324 and 326 are coupled together through the pin 34 of the stabilizer arm and are coupled to the resilient pad 340. The flange pieces have bushings 336 and 337 for receiving the pin 34. Each of the flange pieces has a pair of outer grouser points 330 and three inner grouser points 331. Each of the flange pieces also includes a pair of right angle re-enforcing sections 332 and 334, which provide structural re-enforcement for the pad and as described below provide additional stabilization when the stabilizer pad is used on a rough or unfinished surface. The right angle sections 332 also function as mounting brackets for mounting the reversible resilient pad 340, and each of the right angle sections 332 includes mounting holes 345 for this purpose.

The resilient pad 340, similar to the pad 140 of the first embodiment, is formed from a plurality of rubber strips 350. The rubber strips 350 are compressed between brackets 342a and 342b using steel rods 352. Each of the rubber strips 350 and the brackets 342a and 342b has a slot 362 to receive a mounting plate 322. The mounting plate 322 has mounting holes 360 that align with mounting holes 345 on the flanges to mount the mounting plate to the flanges using bolts 349, washers 346 and nuts 348. In one version of the third embodiment, the flanges 324 and 326 and the mounting plate 322 are made from steel.

Figure 14:
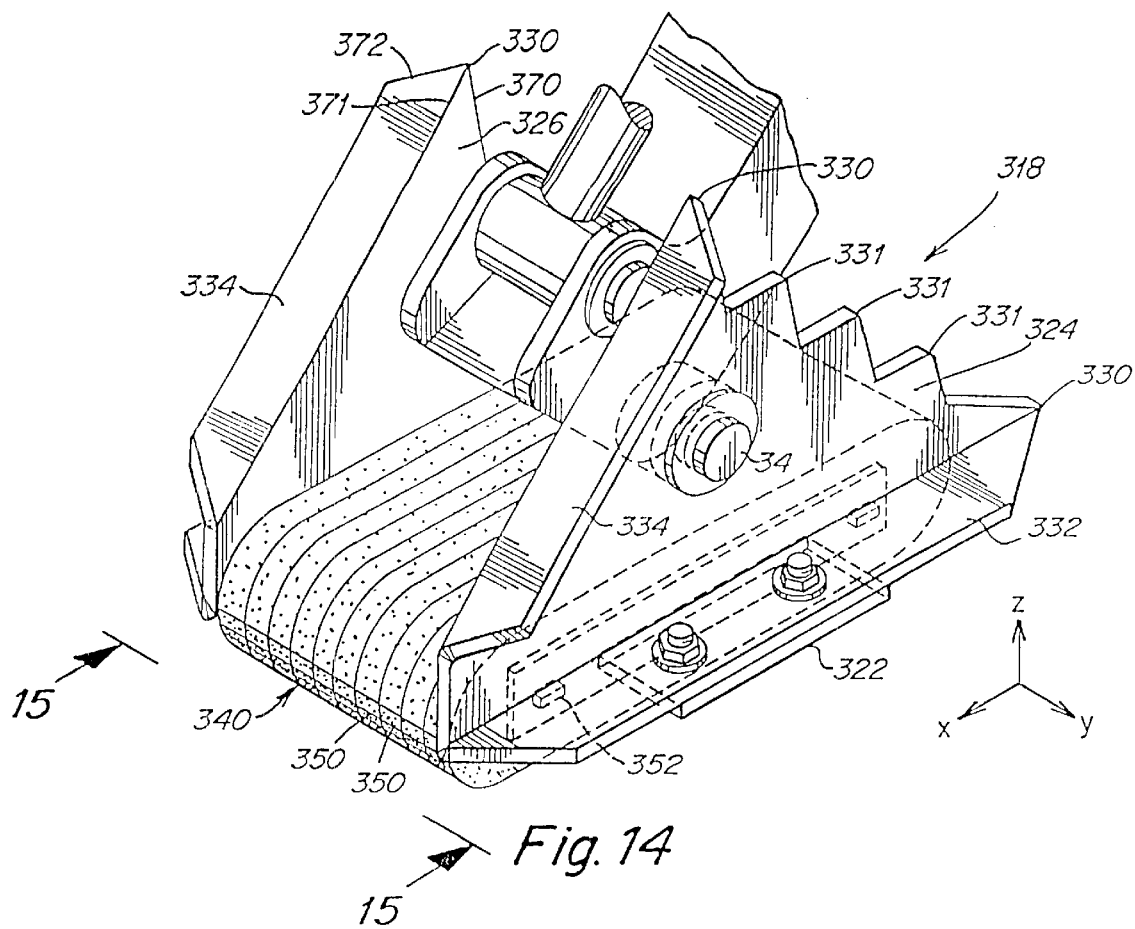
FIG. 14 is a perspective view of a third embodiment of a stabilizer pad with the stabilizer pad in the position for engaging a smooth surface.
Figure 15:
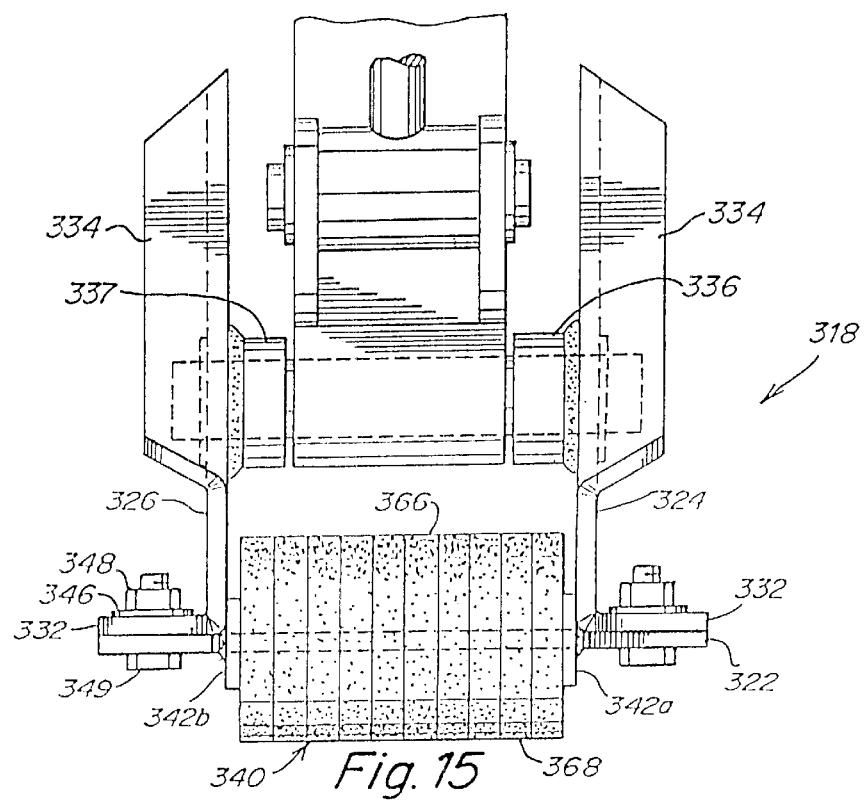
FIG. 15 is a front view of the stabilizer pad of FIG. 14 as taken along line 15—15 of FIG. 14.
Figure 16:
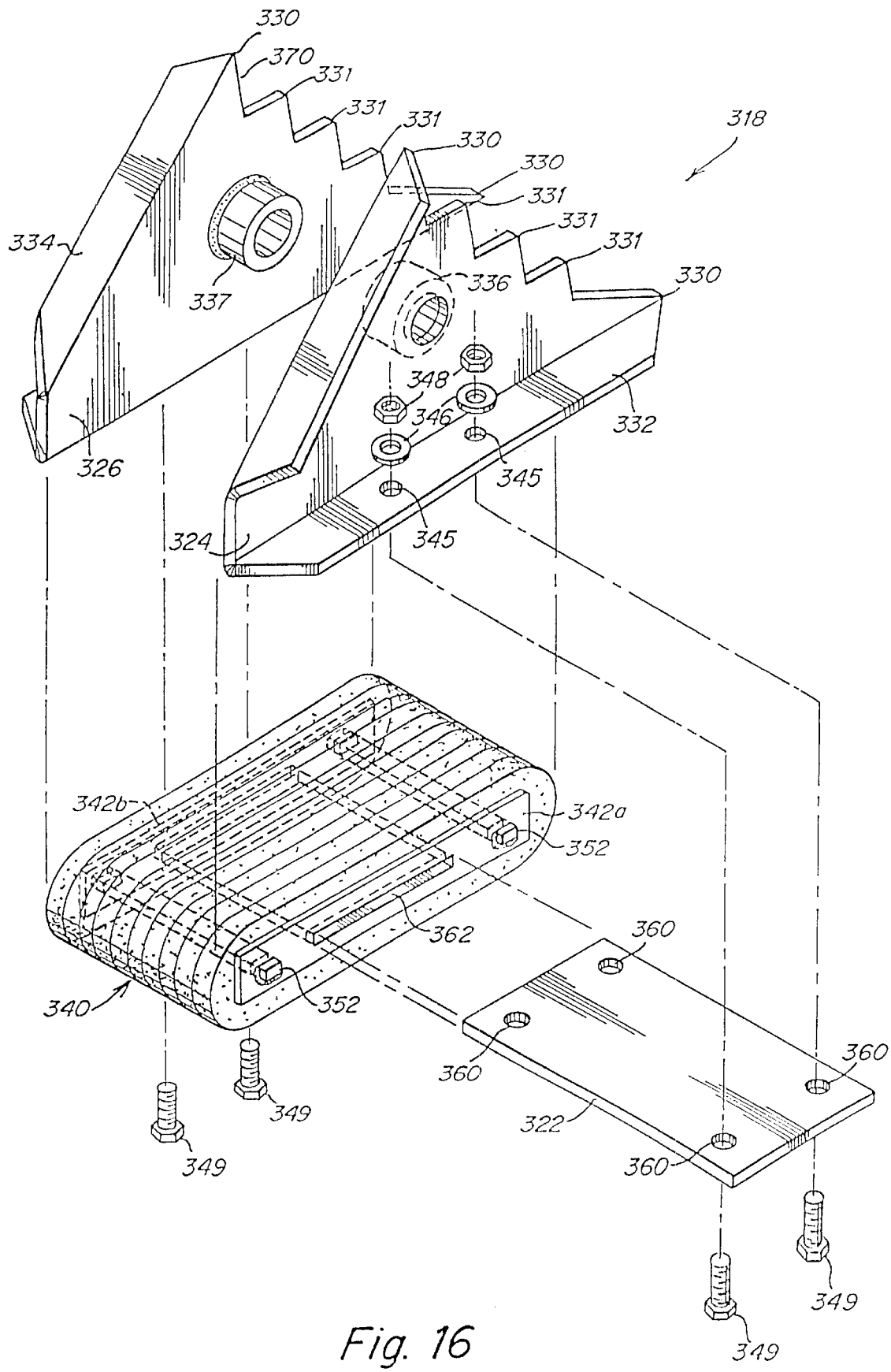
FIG. 16 is an exploded perspective view of the stabilizer pad of FIG. 14.

One significant advantage of the embodiment of the invention shown in FIGS. 14–16 is that the resilient pad 340 is reversible to extend the life of the pad. The resilient pad 340 can be mounted such that either surface 368 contacts the ground (as shown in FIG. 15), or such that surface 366 of the pad contacts the ground. With the resilient pad 340 removed from the flanges, the resilient pad can be rotated 180 degrees to change from surface 368 of the pad facing down to surface 366 of the pad facing down. The rubber strips used with stabilizer pads can wear over time, and the ability to change surfaces of the resilient pad 340 significantly extends the usable life of the resilient pad.

Stabilizer pad 318 is rotatable about pin 34 in a manner similar to stabilizer pad 118 described above to allow either the resilient pad 340 or the grouser points to contact the ground. As with stabilizer pad 118, the outer grouser points 330 are longer than the inner grouser points 331.

In FIGS. 14 and 15, stabilizer pad 318 is shown mounted to the stabilizer arm 14 using pin 34. In other embodiments, the stabilizer pad 318 may be mounted to stabilizer arm 214 using a common pin, such as pin 234 in FIG. 11, with the hydraulic piston 215.

The right angle sections 332 and 334 provide additional stability for the stabilizer pad 318 when the grouser points 330 contact the ground. Typical grouser points, such as those provided on flanges 24 and 26 of prior art stabilizer pad 18 (FIG. 3), have angled surfaces extending in opposite directions along one axis from the tip of the grouser point. Grouser points 330 have angled surfaces 370 and 371 extending from the tip of the grouser points in opposite directions along an x axis (see FIG. 14 for axis orientation), and in addition have angled surfaces 372 extending in a direction along a y-axis orthogonal to the x-axis. The right angle sections provide additional stability by resisting movement of the stabilizer pad in the y-axis direction. As understood by one skilled in the art, in other embodiments, the right angle sections 332 and 334 may form an angle other than ninety degrees with the flanges.

A fourth embodiment of a stabilizer pad 418 in accordance with the present invention will now be described with reference to FIGS. 17 and 18. Stabilizer pad 418 is similar to stabilizer pad 318 and like parts are labeled using the same reference numbers. Stabilizer pad 418 differs from stabilizer pad 318 in that the resilient pad 440 of stabilizer pad 418 has two separate slots 462a and 462b rather than one slot 362 as in resilient pad 340 of stabilizer pad 418. In addition, the mounting plate 322 of stabilizer pad 318 is replaced by two separate mounting plates 422a and 422b in stabilizer pad 418. In the fourth embodiment, two mounting plates are used to mount the resilient pad to the flanges, in other embodiments, more than two mounting plates may be used. In the third and fourth embodiments, the mounting plate or mounting plates act as the base plate for the stabilizer pads.

Figure 19:
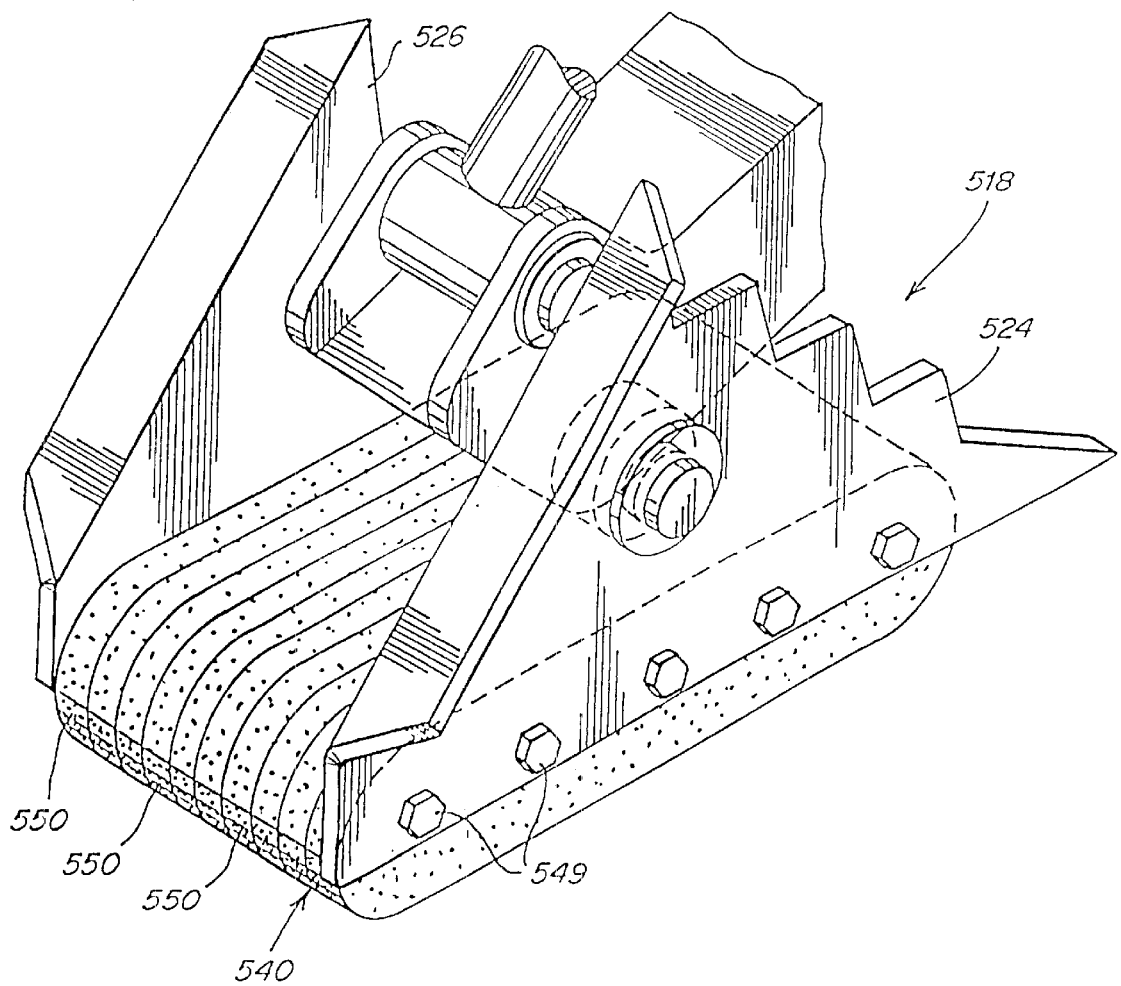
FIG. 19 is a perspective view of a fifth embodiment of a stabilizer pad with the stabilizer pad in the position for engaging a smooth surface.

A fifth embodiment of a stabilizer pad 518 in accordance with the present invention will now be described with reference to FIGS. 19 and 20. Stabilizer pad 518 is similar to stabilizer pad 318 and like parts are labeled using the same reference numbers. The primary difference between stabilizer pad 518 and stabilizer pad 318 is that a mounting plate is not used to mount the resilient pad to the flanges. Rather, bolts are used to compress the rubber strips of the resilient pad between the flanges of the stabilizer pad 518 as described below. In this embodiment, the resilient pad acts as the base plate of the stabilizer pad. Also the bolts function as a plate support of the pad.

Stabilizer pad 518 includes flanges 524 and 526 and resilient pad 540. Flanges 524 and 526 are similar to flanges 324 and 326 of stabilizer pad 318, except that flanges 524 and 526 do not include right angle brackets 332, and flanges 524 and 526 include mounting holes 545 for mounting the resilient pad to the flanges using bolts 549, washers 546 and nuts 548.

Resilient pad 540 includes rubber strips 550, each of which has holes 562 for receiving the bolts 549. Resilient pad 540 differs from resilient pad 340 in that pad 540 does not include metal brackets for compressing the rubber strips 550. In stabilizer pad 518, the rubber strips 550 are compressed together between the flanges 524 and 526 using the bolts 549 and the nuts 548. In the embodiment shown in FIGS. 19 and 20, the holes 562 for the bolts 549 in the resilient pad 540 are centered between a first planar surface 566 and a second planar surface 568 of the pad 540. This allows the resilient pad to be reversible so that either the first planar surface or the second planar surface is positioned to contact the ground.

A sixth embodiment of a stabilizer pad 618 will now be further described with reference to FIGS. 21 and 22. Stabilizer pad 618 is similar to stabilizer pad 118 described above in that both have a substantially U-shaped frame made from a continuous steel sheet. Stabilizer pad 618 differs from stabilizer pad 118 in that the degree of rotation from one working side of the stabilizer pad to the other working side is 180 degrees for stabilizer pad 618 verses 135 degrees for stabilizer pad 118.

The U-shaped frame of stabilizer pad 618 includes a base plate 622, flanges 624 and 626 and a resilient pad 640. Each of the flanges has grouser points 630. The resilient pad is mounted to mounting holes 639 of the base plate 622 using bolts 649, washers 646 and nuts 648. The resilient pad 640, like resilient pad 140, is formed using a plurality of rubber strips 650 that are compressed using brackets 642a and 642b and steel rods 652. In the embodiment shown, the steel rods 652 are welded to each of the brackets 642a and 642b. Each of the brackets 642a and 642b have right angle sections 643 having holes 644 for mounting the resilient pad 640 to the base plate 622.

A seventh embodiment of a stabilizer pad 718 in accordance with the present invention will now be described with reference to FIG. 23. Stabilizer pad 718 is substantially identical to stabilizer pad 618 except that the U-shaped frame of stabilizer pad 618 is replaced by two flange sections 724 and 726. Each of the flange sections has grouser points 730 and a right angle bracket 722 having mounting holes 739 for mounting the resilient pad to the flange sections.

In stabilizer pads 618 and 718, all of the grouser points 630 and 730 are shown as being of approximately the same height. In other versions, the outermost grouser points on each of the flanges may be longer than the inner grouser points to provide four-point contact of the stabilizer pads at substantially the outermost points on the stabilizer pads to maximize stability.

Figure 17:
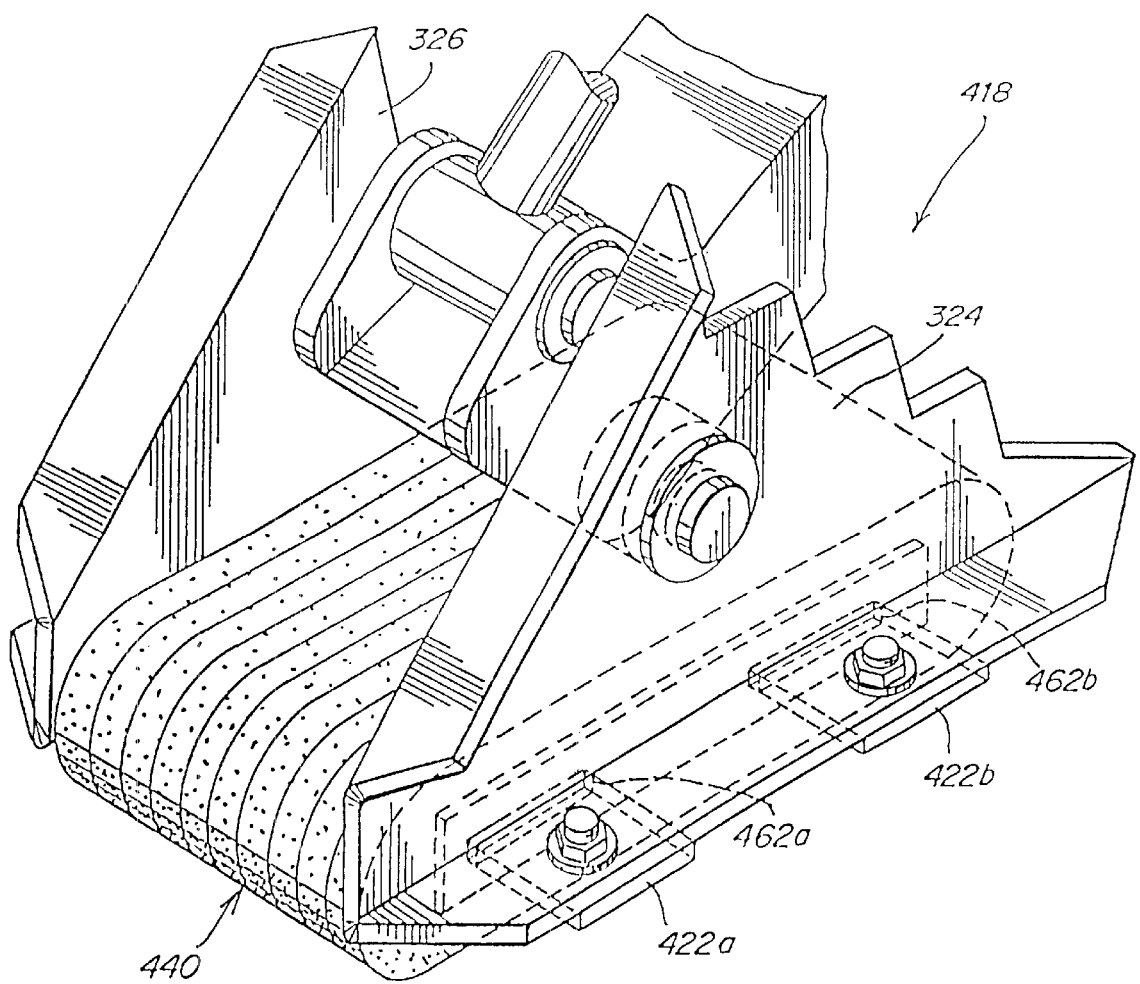
FIG. 17 is a perspective view of a fourth embodiment of a stabilizer pad with the stabilizer pad in the position for engaging a smooth surface.
Figure 18:
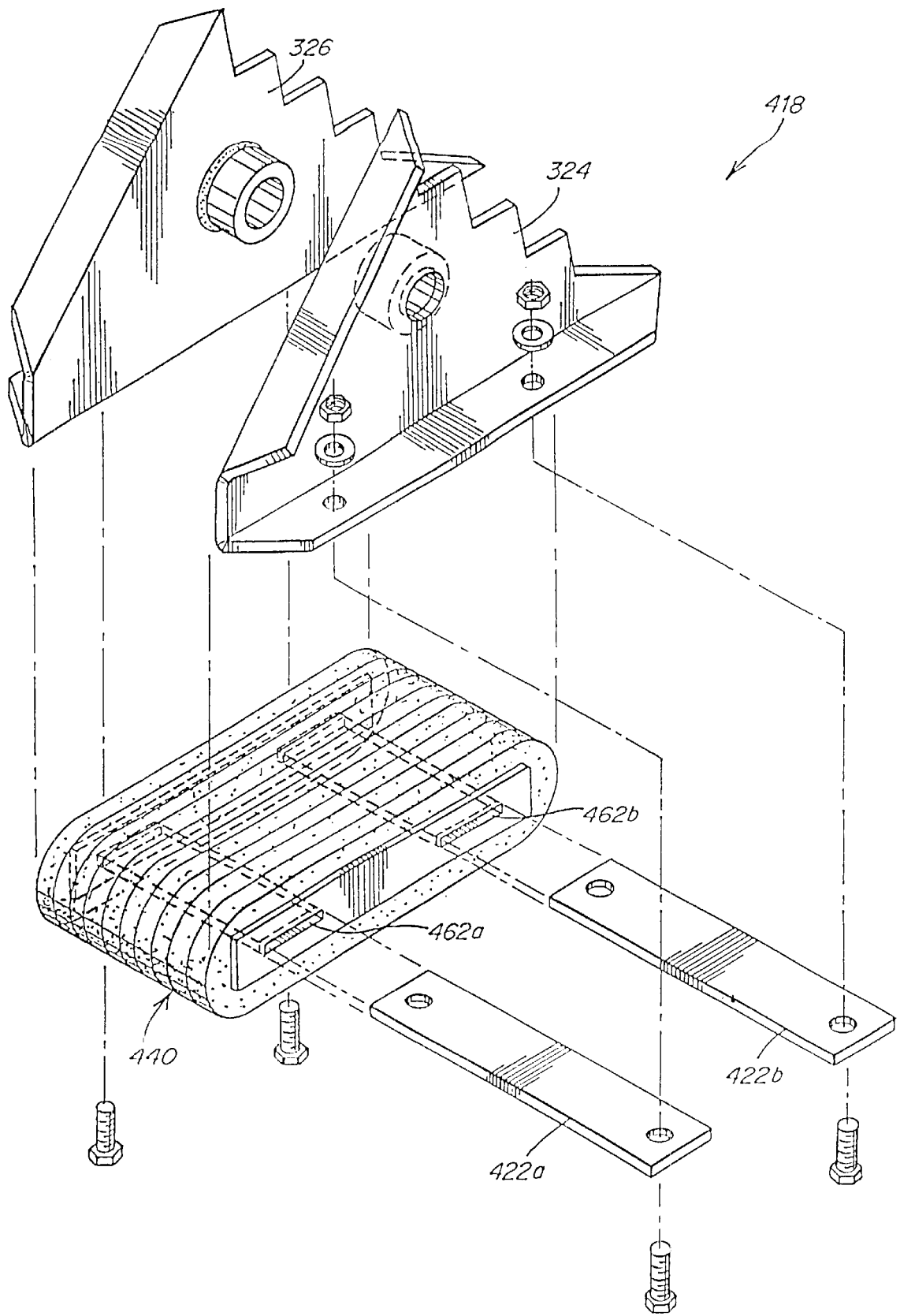
FIG. 18 is an exploded perspective view of the stabilizer pad shown in FIG. 17.
Figure 20:
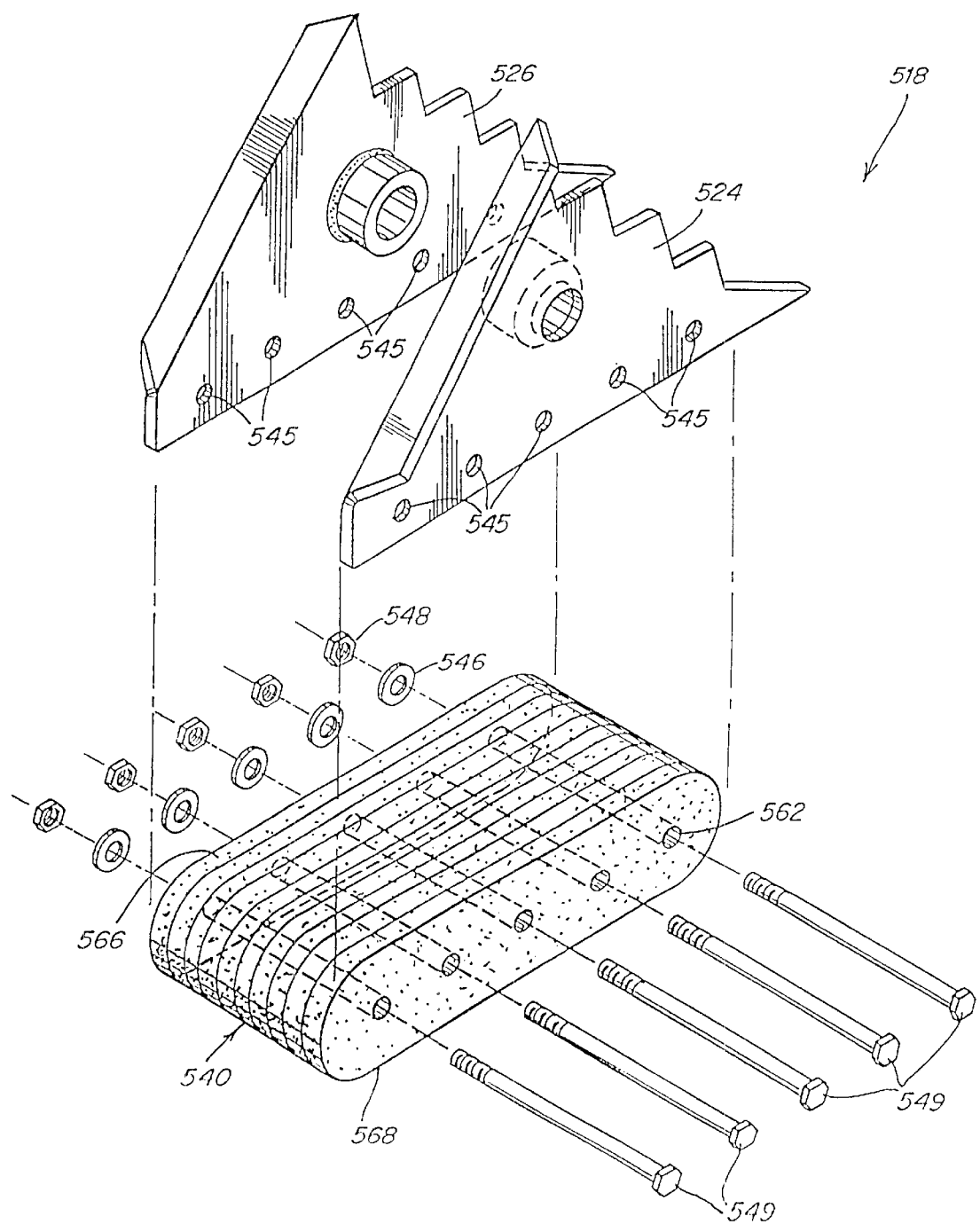
FIG. 20 is an exploded perspective view of the stabilizer pad of FIG. 19.
Figure 21:
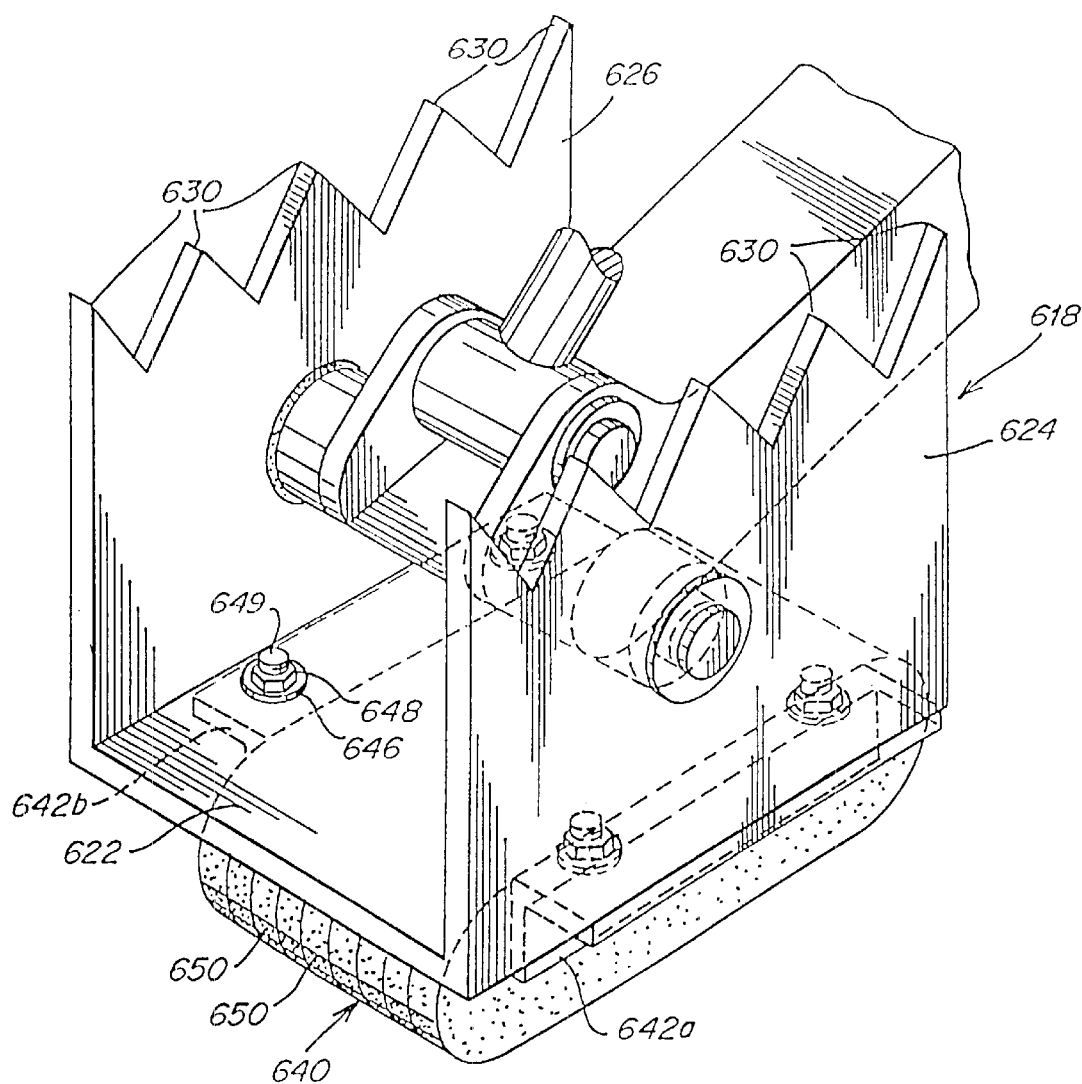
FIG. 21 is a perspective view of a sixth embodiment of a stabilizer pad with the stabilizer pad in the position for engaging a smooth surface.
Figure 22:
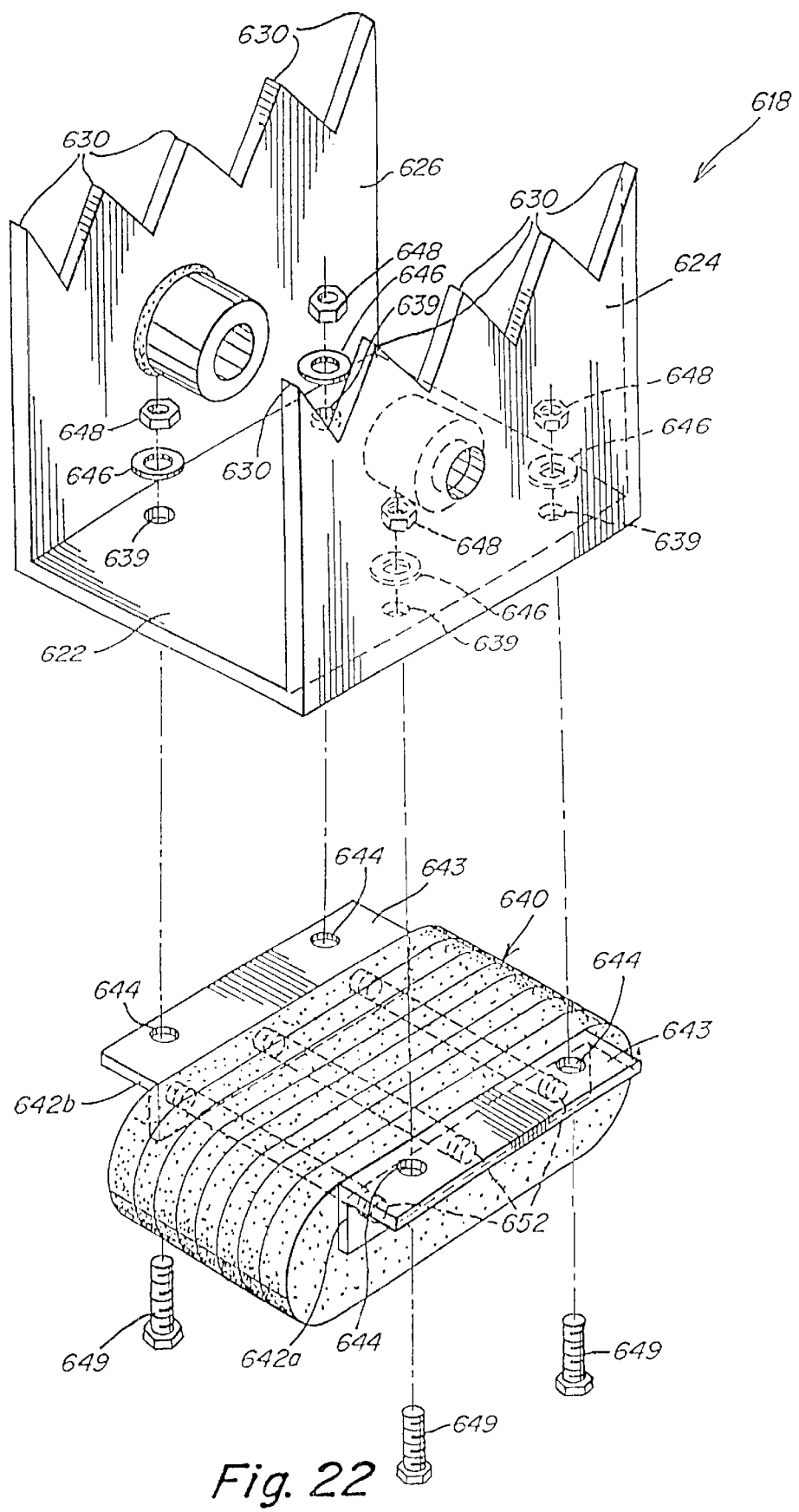
FIG. 22 is an exploded perspective view of the stabilizer pad of FIG. 21.
Figure 23:
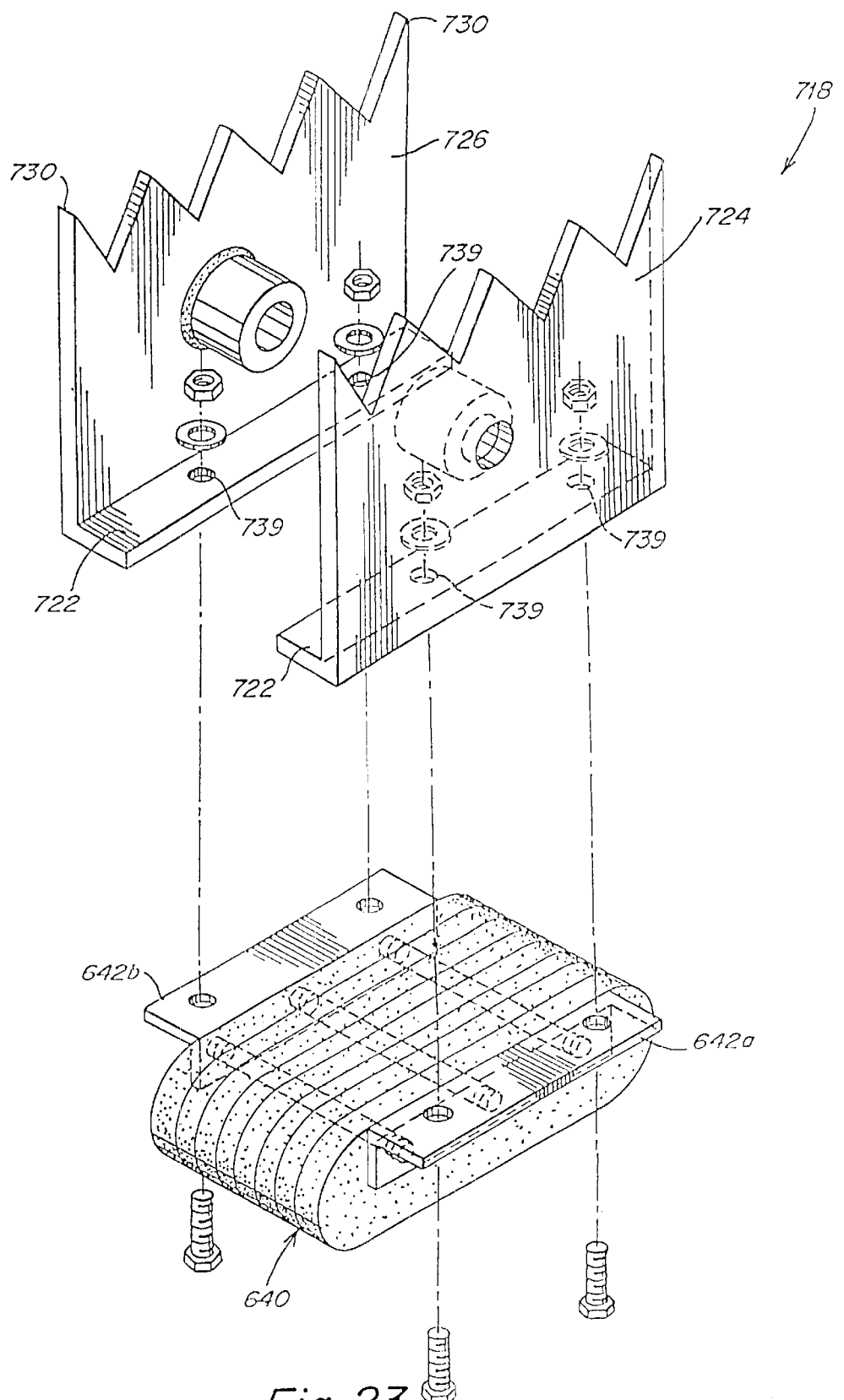
FIG. 23 is an exploded perspective view of a sixth embodiment of a stabilizer pad with the stabilizer pad in the position for engaging a smooth surface.

In other versions of the embodiment shown in FIGS. 21–23, the flanges and brackets can be modified to accommodate the resilient pad 140 shown in FIG. 4, or one of the reversible resilient pads shown in FIGS. 14, 17 and 20.

The embodiments of the invention shown in FIGS. 11–23 do not include the cam 156 and the wheel 158 described above with respect to the stabilizer pad 118. As understood by one skilled in the art, to prevent self-flipping of the stabilizer pads shown in FIGS. 11–23, the cam 156 could be included on the stabilizer pads and the wheel 158 could be included on the arm.

Some embodiments of the present invention described above have reversible rubber pads. The reversible pads could be replaced with single-sided pads as understood by those skilled in the art.

One advantage of embodiments of stabilizer pads of the present invention over prior art stabilizer pads is a reduction in manufacturing costs. In the first embodiment of the present invention, described above with reference to FIGS. 4–10, the U-shaped frame can be formed from one piece of steel without requiring any welding. Alternatively, the U-shaped frame could be manufactured as a single cast piece. A further reduction in manufacturing costs is provided by the use of a single laminated pad in place of the three laminated pads used in the prior art stabilizer pad shown in FIGS. 1–3. In addition to reducing manufacturing costs, stabilizer pads of the present invention are inherently structurally stronger than prior art pads and are therefore less susceptible to wear and have an extended operational life, even in adverse operating environments. Also, the use of a reversible laminated pad significantly increases the life of stabilizer pads of the present invention.

In the prior art, one side of the resilient pad used with stabilizer pads is typically coupled to a rigid mounting member for mounting the resilient pad to the stabilizer pad. The resilient pads used in embodiments of the present invention are mounted to the stabilizer pad at a central point in the pad to allow the pad to have two or more working surfaces to significantly extend the life of the pad. In illustrative embodiments described above, resilient pads have two working surfaces. However, the present invention is not limited to pads having two working surfaces, but includes pads with more than two working surfaces.

In embodiments of the present invention described above, stabilizer pads include flanges having grouser points for engaging a rough or gravel ground surface. As understood by those skilled in the art, grouser points used with embodiments of the present invention are not limited to tapered steel points formed in the flanges, but also include other gripping devices arranged on the stabilizer pad to enable the stabilizer pad to grip a rough or gravel surface to prevent the stabilizer pad from slipping.

An eighth embodiment of a stabilizer pad 818 in accordance with the present invention will now be described with reference to FIGS. 24 and 25. Furthermore, a ninth embodiment of a stabilizer pad 918 will also now be described with reference to FIGS. 26 and 27. Both of these embodiments employ basic stabilizer pad constructions of the type described, for example, in U.S. Pat. Nos. 4,761,021 and 5,050,904. These constructions support the resilient pad laterally in a spaced side-by-side relationship rather than most of the earlier embodiments described herein in which the resilient pad is centrally supported.

Figure 24:
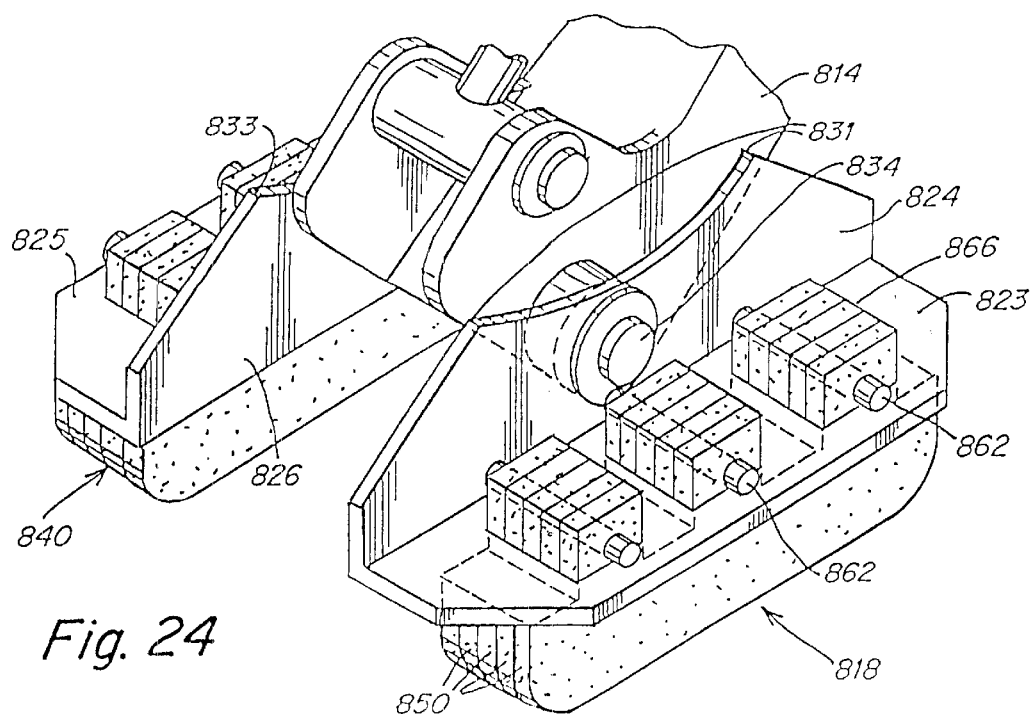
FIG. 24 is a perspective view of a further embodiment of the present invention with the stabilizer pad in a position for engaging a smooth surface.
Figure 25:
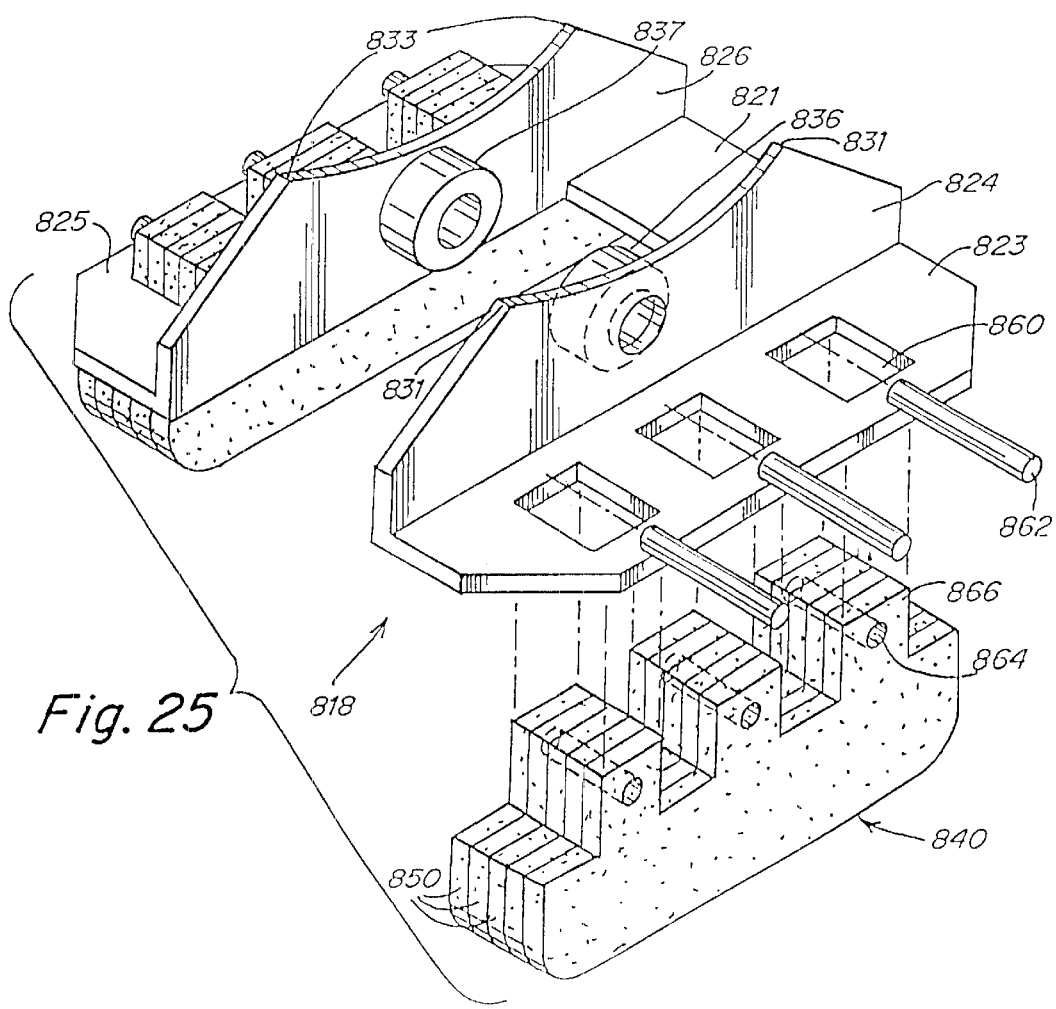
FIG. 25 is an exploded view of the stabilizer pad of FIG. 24.

With further specific reference to FIGS. 24 and 25, there is described a stabilizer pad 818 supported from a stabilizer arm 814. For this support there is provided the bushings 836 and 837 for receiving the support pin 834.

The pad itself is comprised of separate flanges 824 and 826. Each of these flanges has a respective base 823 and 825. For example, the flange 824 is formed with a base 823 in a right angle arrangement and is constructed of a single piece of heavy-duty metal.

Each of the flanges 824 and 826 have respective grouser points 831 and 833. In this particular embodiment there are two grouser points associated with each flange and the grouser points are disposed symmetrically with respect to the bushings associated with each flange. This provides a stable grouser point construction when the pad is used in rough terrain such as in dirt or gravel. In this regard, in the orientation of the pad illustrated in FIGS. 24 and 25, rather than the grouser points contacting the ground, the resilient pads 840 are in position for contact with a ground surface such as an asphalt or concrete surface.

In the embodiment illustrated in FIGS. 24 and 25 the flanges 824 and 826 are interconnected by a cross-piece 821 disposed at one end of each of the flanges. This provides an open center section that receives the arm 814.

The embodiment of FIGS. 24 and 25 provides a quite simplified way of attaching the resilient pad 840 to either of the flanges 823 or 825. For this purpose, each of the flanges is provided with a plurality of slots 860. In the embodiment illustrated in FIG. 24 three slots 860 are provided. However, it is understood that fewer or greater numbers of slots can be employed.

Depending upon the number of slots provided, the resilient pad 840 is likewise cut-out on its top section to provide upstanding portions 866, each having a hole 864 extending therethrough, such as illustrated particularly clearly in FIG. 25. Each of these upstanding portions 866 extends through a corresponding slot 860 into the position illustrated in FIG. 24. A plurality of cross-rods 862 are then used. These extend into the holes 864 and preferably provide a press-fit. The rods 862 are preferably positioned against the top surface of the flange on either side and may be welded to the flange or secured in any other suitable manner to the flange so that the cross-rods do not disengage.

Prior to assembly, the resilient pad 840 which is comprised of a plurality of rubber strips 850, is secured together. These individual strips can be joined together by several different means such as by gluing, stapling, bolting or riveting. Also, the resilient pad 840 can be a single piece molded block still having the cut slots defining the upstanding portions. Further, the strip could be left unglued.

Figure 26:
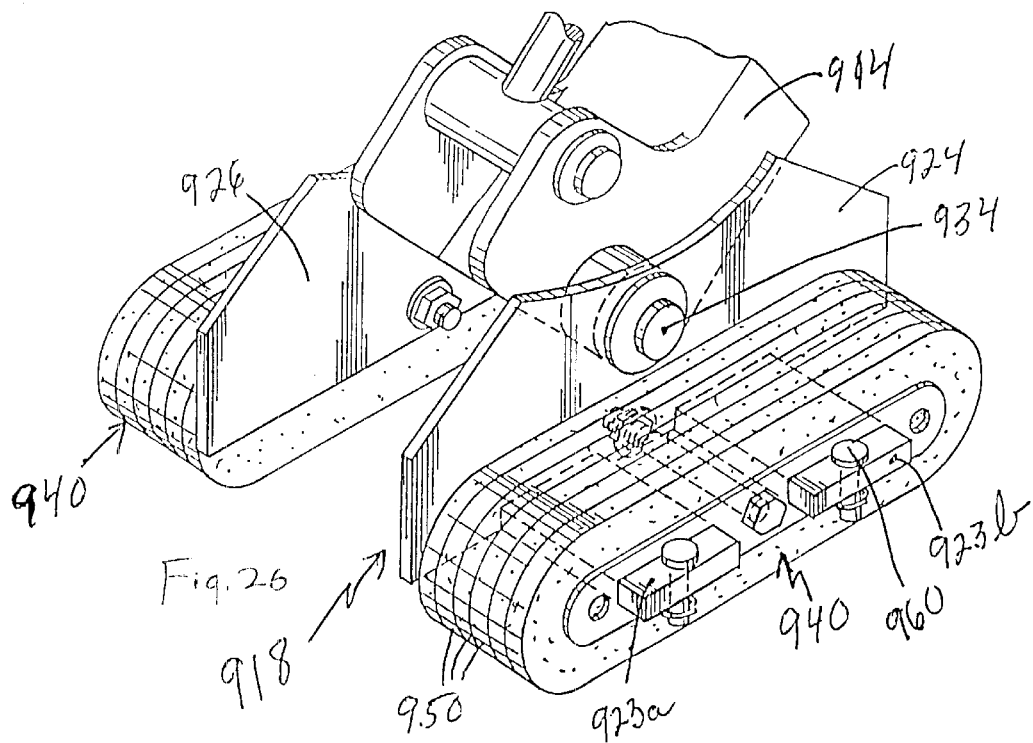
FIG. 26 is a perspective view of still another embodiment of the present invention employing a reversible resilient pad.
Figure 27:
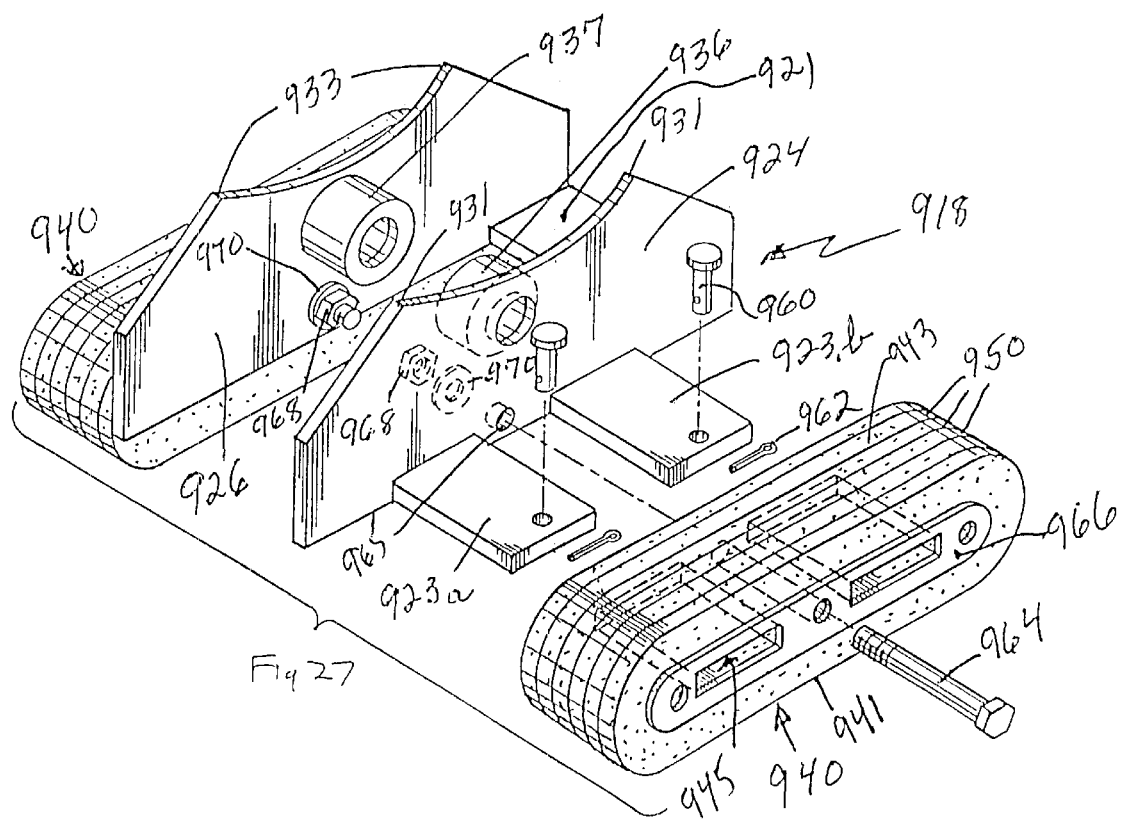
FIG. 27 is an exploded view of the stabilizer pad of FIG. 26.

Now, reference is made to the ninth embodiment of the present invention illustrated in FIGS. 26 and 27. This embodiment, although similar to the embodiment of FIGS. 24 and 25, is different in that the resilient pad 940 in the ninth embodiment is reversible. In this way the resilient pad 940 can be removed and essentially rotated through 180° so that extended wear of the pad becomes an important aspect of this particular construction.

With further reference to FIGS. 26 and 27 there is shown a stabilizer pad 918 that is comprised of flanges 924 and 926. These flanges are similar to the flanges illustrated in FIGS. 24 and 25 and thus include respective grouser points 931 and 933. Instead of the single base piece illustrated in the eighth embodiment, in the ninth embodiment, as illustrated clearly in FIG. 27, there are provided base pieces 923a and 923b. Likewise, the flange 926 has associated therewith base pieces 925a and 925b. Each of these base pieces extends at a right angle from its associated flange and the base pieces are spaced from each other a predetermined distance. Each of the base pieces is provided with a hole at the end thereof for receiving a stud 960, which in turn receives a corresponding cotter pin 962. The purpose of the stud and cotter pin is to secure the resilient pad 940 to these base pieces.

The flanges 924 and 926 are supported from the stabilizer arm 914 by means of the bushings 936 and 937 which receive the pivot pin 934. Also, the flanges are interconnected by means of the cross-piece 921 illustrated in FIG. 27.

The resilient pad 940 is constructed of a number of individual strips or segments 950. These segments are secured together and form a somewhat oblong shape. The shape could also be rectangular, circular, hexagon, triangular, octagon, or some other form and preferably has a lower contact surface 941 and an upper contact surface 943. These two surfaces are preferably, but not necessarily, parallel to each other.

The resilient pad 940 is supported in a central manner and for that purpose there are provided slots 945 that extend through the pad.. The base pieces extend into these slots and the pad is finally positioned in the manner illustrated in FIG. 26. To hold the pad together, the individually strips may be glued, stapled, bolted or riveted. Alternatively, the strip may be left unglued. Also, there is provided an end plate 966 also having slots corresponding to the slots in the pad material itself. As illustrated in FIG. 26 the studs 960 extend through end holes in each of the base pieces. These studs may also bear against the outer surface of the end plate 966 and are held in position by means of the aforementioned cotter pins 962.

Also, a bolt 964 of somewhat elongated construction extends through the resilient pad and through a hole 965 in the flange 924. The bolt 964 is secured by means of a washer 970 and a nut 968. The bolt 964 and its associated nut and washer is used, of course, on each of the pads associated with the respective flanges 924 and 926.

As can be seen quite readily, in the embodiment of FIGS. 26 and 27, the pad 940 is reversible. This can be reversed by simply removing the bolt 964 and the studs 960 and rotating the pads so that rather than surface 941 being the ground contact surface, the surface 943 is the ground contact surface.

A further embodiment of the present invention is now illustrated in FIGS. 28–33. This particular pad construction may be referred to as an offset pad. It has been found that due to certain machine constraints, clearances between the pad and machine make this offset arrangement more advantageous. For example, machine tires or fenders may be arranged so that a symmetrical type pad cannot be employed. The design in this last embodiment provides an offset arrangement yet allowing the loading on the resilient pads to be equalized. Proper pad balance may be achieved without the use of additional counterweights.

Figure 28:
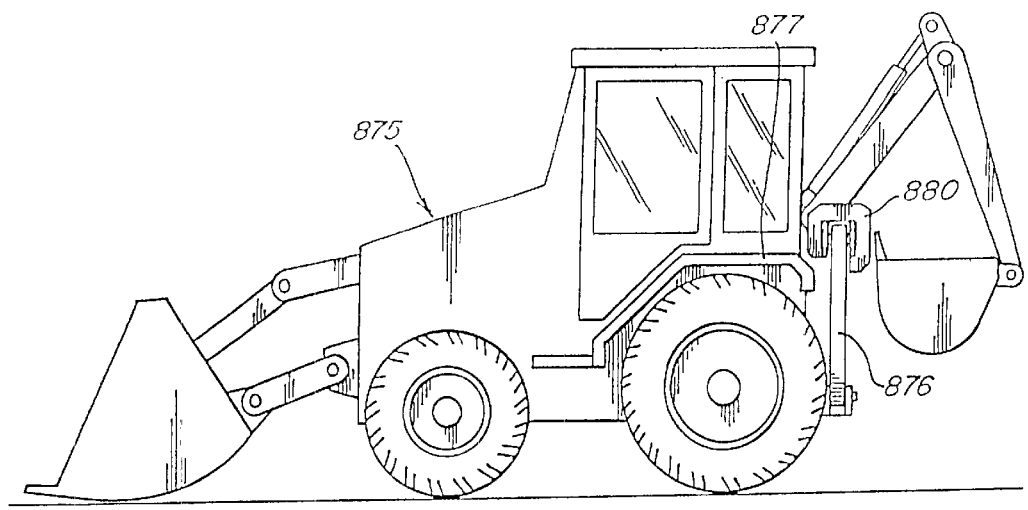
FIG. 28 is an illustration of a backhoe embodying an offset pad construction.
Figure 29:
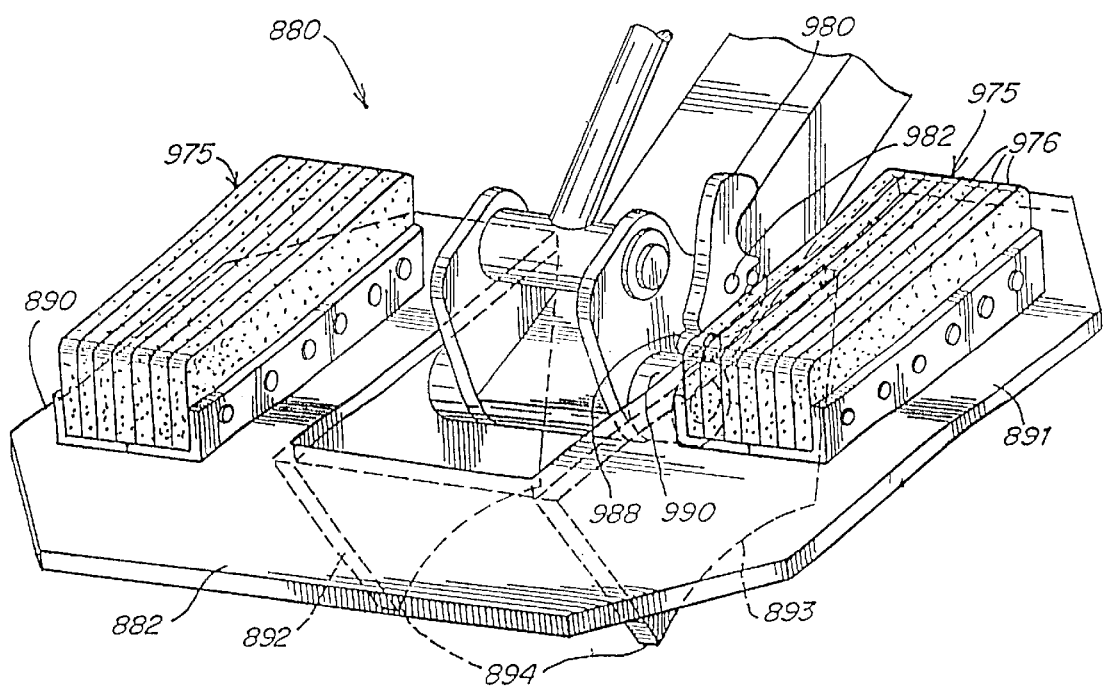
FIG. 29 is a perspective view of the offset pad construction also employing a releasable latch.

FIG. 28 is a depiction of a backhoe 875 with there being provided a stabilizer arm 876 depicted as having the offset pad 880 affixed thereto. By way of example it is noted that a fender 877 is arranged in a manner so that if the symmetrical pad were to be used there would be interference between the pad and the body of the vehicle. Accordingly, by means of this offset pad arrangement there is no interference between the pad and any parts of the body of the vehicle.

Figure 30:
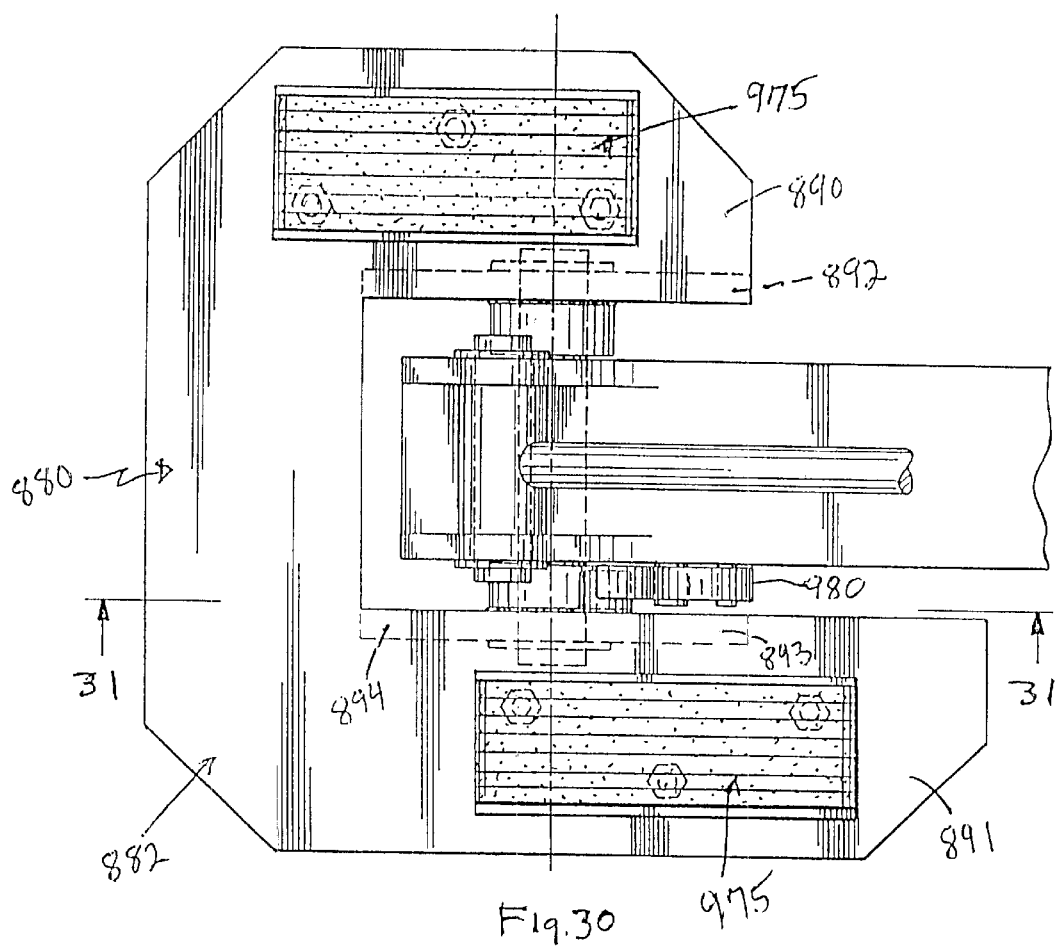
FIG. 30 is a plan view of the embodiment of FIG. 29.
Figure 31:
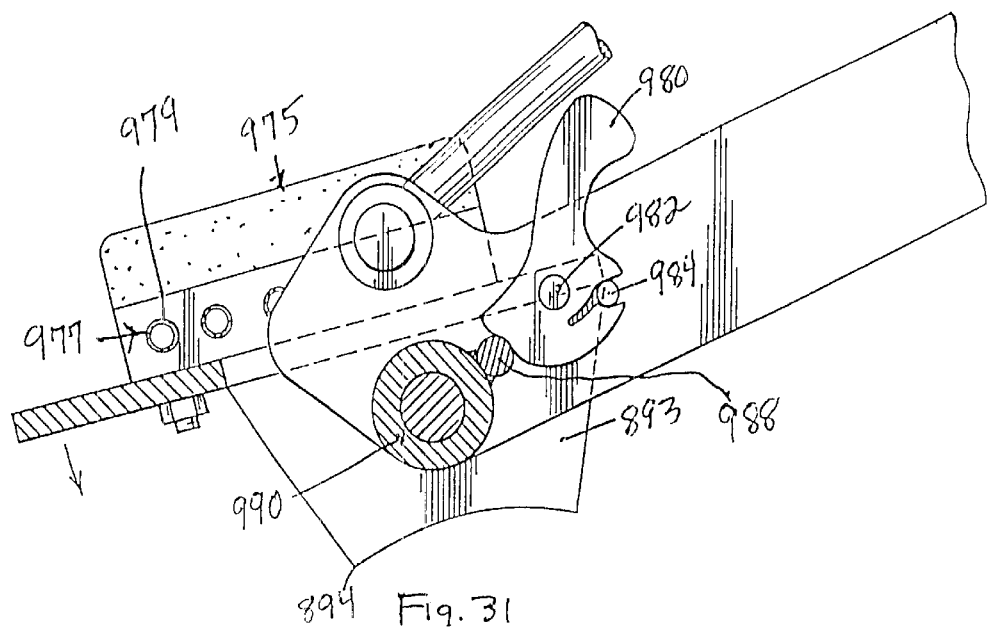
FIG. 31 is a side view of the embodiment of FIG. 29 with the latch in a locked position.
Figure 33:
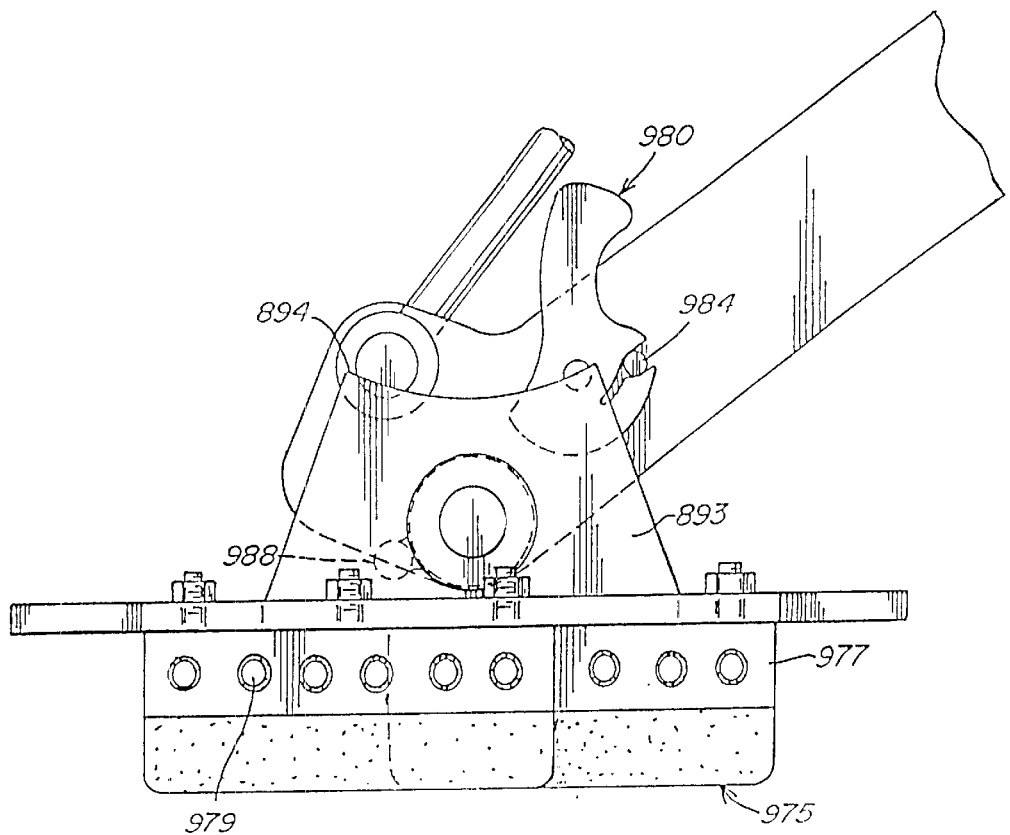
FIG. 33 is a side view of the stabilizer pad with the pad rotated through 180°.

The pad 880 is constructed with a base 882 having, as illustrated in, for example, FIG. 30, offset legs 890 and 891. Associated with legs 890 and 891 are upstanding flanges 892 and 893, respectively. Each of these flanges have a pair of grouser points 894 such as illustrated in FIG. 33. FIG. 31 shows the pad in the position in which the grouser points are engaging the ground surface.

Figure 32:
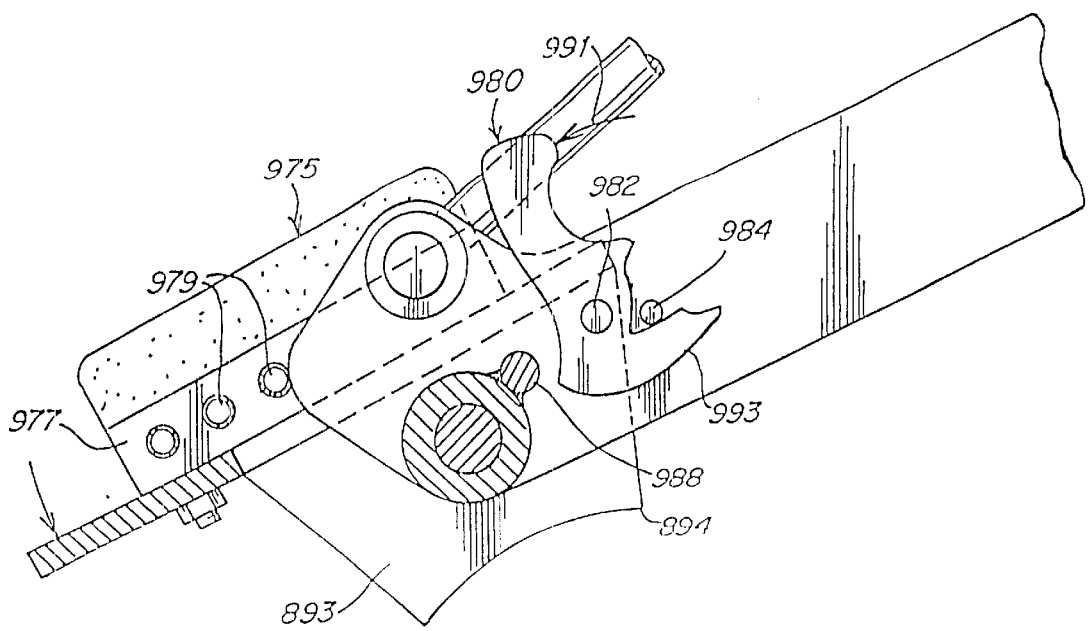
FIG. 32 is a side view with the latch in a released position.

This last embodiment of the present invention also illustrates a resilient pad 975, one associated with each of the legs 890 and 891. The pad 975 may be constructed of a series of separate resilient strips 976, all secured together and disposed within a U-shaped holder 977. As illustrated in FIGS. 31–33, a series of rods 979 may be employed to hold the resilient pad in the U-shaped holder 977. For a somewhat similar pad construction refer to U.S. Pat. No. 4,761,021 which is hereby incorporated by reference hereinto.

As illustrated in FIG. 30, the offset legs 890 and 891 are of different length. Leg 890 is shorter than the leg 891. Accordingly, the resilient pad on the leg 890 is arranged more towards the outer end of the pad construction while the pad associated with leg 891 is disposed more inwardly of the pad construction.

This embodiment of the present invention also illustrates an important concept in a releasable latch. Although this releasable latch is illustrated with regard to the embodiment of FIGS. 28–33, such a releasable latch may also be used with other embodiments of the present invention described herein.

This embodiment of the invention illustrates the latch 980. The latch 980 is supported from the arm by means of a pivot pin 982. Also supported from the arm is a fixed position stop 984. The latch 980 has a slot 986 for engaging with the stop 984. As illustrated is, for example, FIG. 31 a cam 988 is provided to interact with the latch 980. The cam 988 is supported from bushing 990. The cam 988 may be a fixed metal rod. The releasable latch 980 is made of a resilient material. It may be of material 95a Duro with a thickness of $\frac{7}{8}^{ths}$ inch.

Now, with regard to FIG. 31, it is noted that the latch is basically in its locked position. The stop 984 is engaged with the latch and the far end of the latch is in turn engaged with the cam 988. However, because the latch 980 is resilient it will allow the pad to reverse if potentially damaging obstacles are encountered when operating the machine.

Also, the latch can be released as is illustrated in FIG. 32. By pushing the latch manually in the direction of arrow 991, the latch essentially disengages from cam 988. This permits the pad to then be rotated to the position illustrated if FIG. 33 with the resilient pads now in engagement with the ground surface. In connection with the illustration of FIG. 32, it is noted that the latch 980 has a tab 993 that functions as a spring to return the latch to its locked position. In the position of FIG. 33 the latch is in its locked position but is not in engagement with the cam as the pad has been rotated to its other position.

Figure 34:
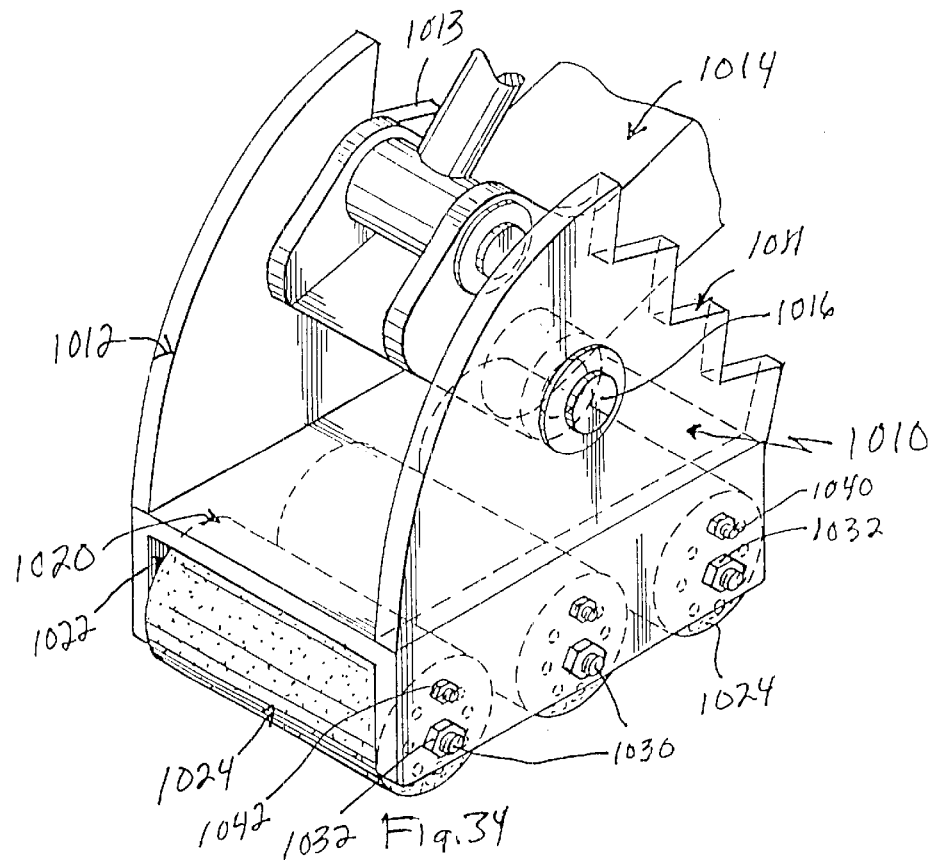
FIG. 34 is a perspective view of still another embodiment of the present invention.
Figure 35:
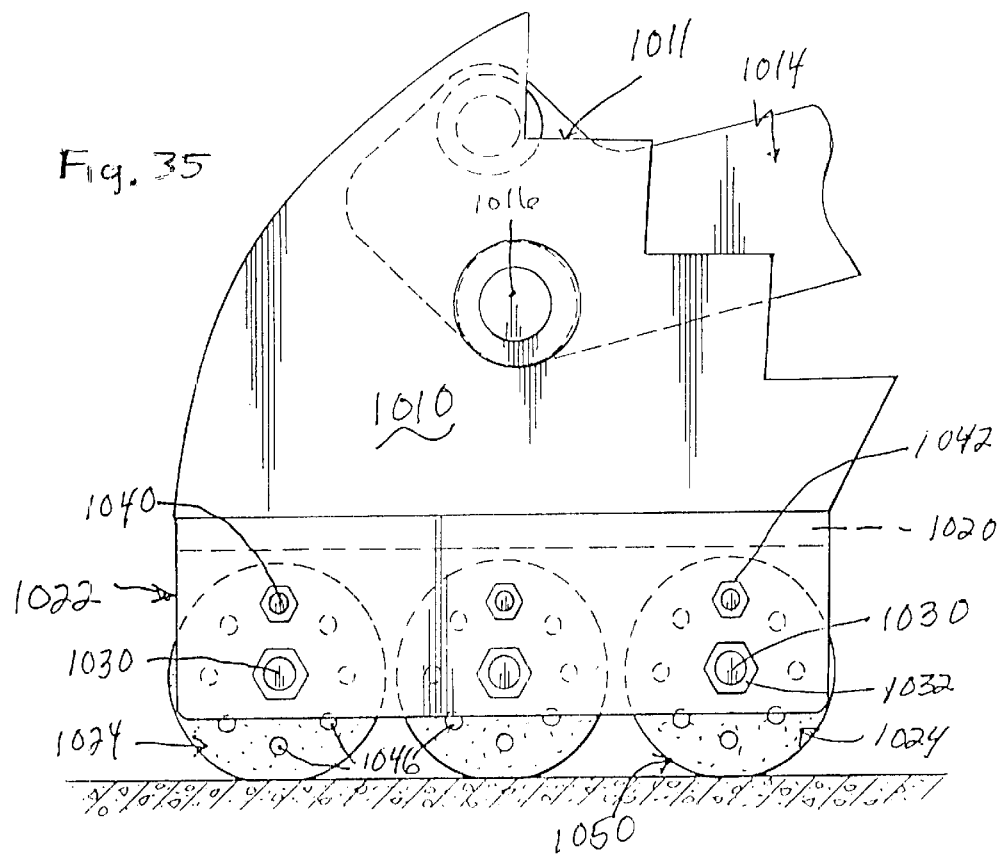
FIG. 35 is a side view of the embodiment of the invention illustrated in FIG. 34.

Reference is now made to FIGS. 34 and 35 for another embodiment of the present invention. This describes a stabilizer pad construction including plate members 1010 and 1012. As with other embodiments described herein, the stabilizer arm 1014 has the stabilizer pad supported therefrom by means of the pin 1016. In the version of FIGS. 34 and 35, a base plate 1020 extends between the plate members 1010 and 1012. Portions of the plate members 1010 and 1012 extend below the base plate 1020 and form a pocket 1022 in which are disposed a plurality of resilient pads 1024.

It is noted in FIGS. 34 and 35 that this particular pad construction is also provided with grouser points. These are illustrated in FIG. 34 as grouser points 1011 associated with plate member 1010 and grouser points 1013 associated with plate member 1012. The particular pad construction illustrated in FIGS. 34 and 35 is reversible so that either the resilient pads 1 024 are in a ground engaging position, such as illustrated in the drawings, or alternatively, the pad may be swiveled so that the grouser points 1011 and 1013 are in a ground engaging position.

As illustrated in the drawings, there are three separate resilient pads 1024 illustrated in this particular embodiment. Fewer or more than three pads may be used. These pads are supported so that there is a slight space between them (see FIG. 35) but they could also be supported in a touching position. Each of these pads is supported by an elongated bolt 1030 that is adapted to pass through a center passage in each of the resilient pads. The head of the bolt may be disposed against the plate member 1012. A nut 1032 is illustrated secured to the threaded end of the bolt and for maintaining this mounting member in a fixed position relative to the plate members.

To keep the resilient pads 1024 from rotating and to maintain them with one of multiple peripheral surfaces in a ground engaging position, there are provided also bolts 1040 and associated nuts 1042. Also note that the resilient pad 1024 has a plurality of through holes 1046 for accommodating the bolt 1040. In the embodiment illustrated in FIGS. 34 and 35 there are eight such through holes 1046. With the use of eight holes there is provided a minimum rotation of 45°.

With the pad in the position illustrated in FIG. 35, there is considered to be a wear surface generally indicated at 1050 extending below the plate member. The bolt 1040 and its associated nut 1042 retains each of the resilient pads in the position illustrated and prevents them from rotating. When the surface 1050 has worn sufficiently, then each of the bolts 1040 may be disengaged from the through passage in its corresponding resilient pad and then the pads can each individually be rotated through anywhere from 45°, to 90°, or more to present a different wear surface to the ground. The bolts 1040 are then realigned with another hole 1046 in each of the resilient pads and each of the resilient pads are thus then oriented in a new position with a new work surface facing the ground.

The embodiment illustrated in FIGS. 34 and 35 is also useful in that each of the resilient pads can be totally replaced quite easily by, not only removing the bolt 1040, but also removing the supporting member bolt 1030. A new resilient pad can then be put into place. In FIGS. 34 and 35, it is noted that each of the resilient pads is shown of cylindrical construction. However, in alternate embodiments of the invention these pads may also each be of other configurations such as square or triangular.

Figure 36:
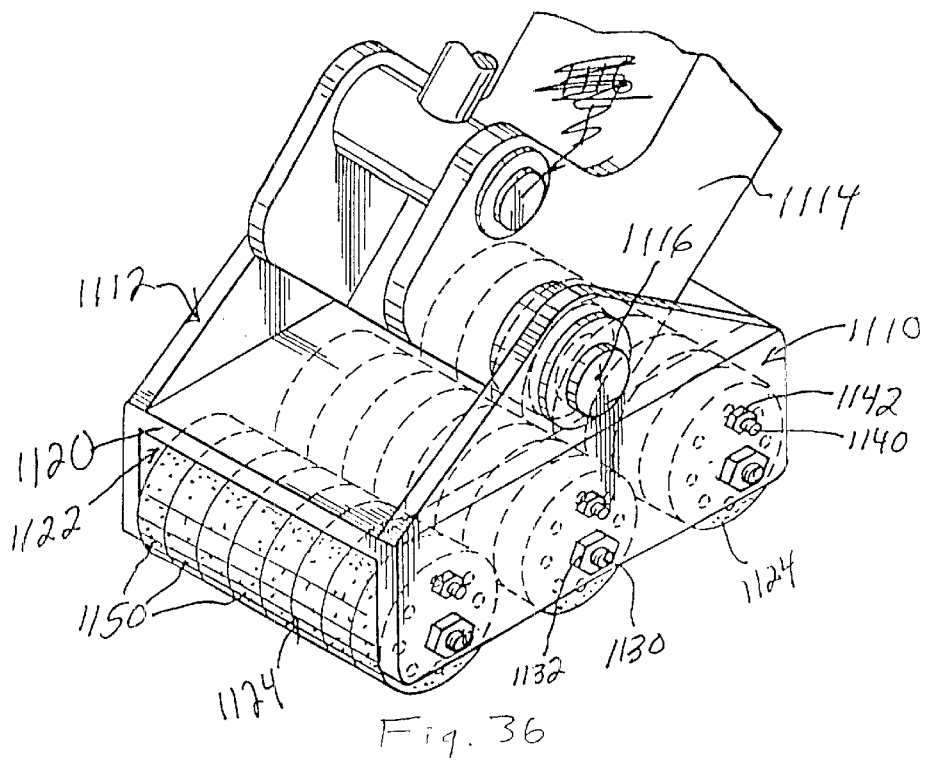
FIG. 36 is a perspective view of another embodiment of the present invention.
Figure 37:
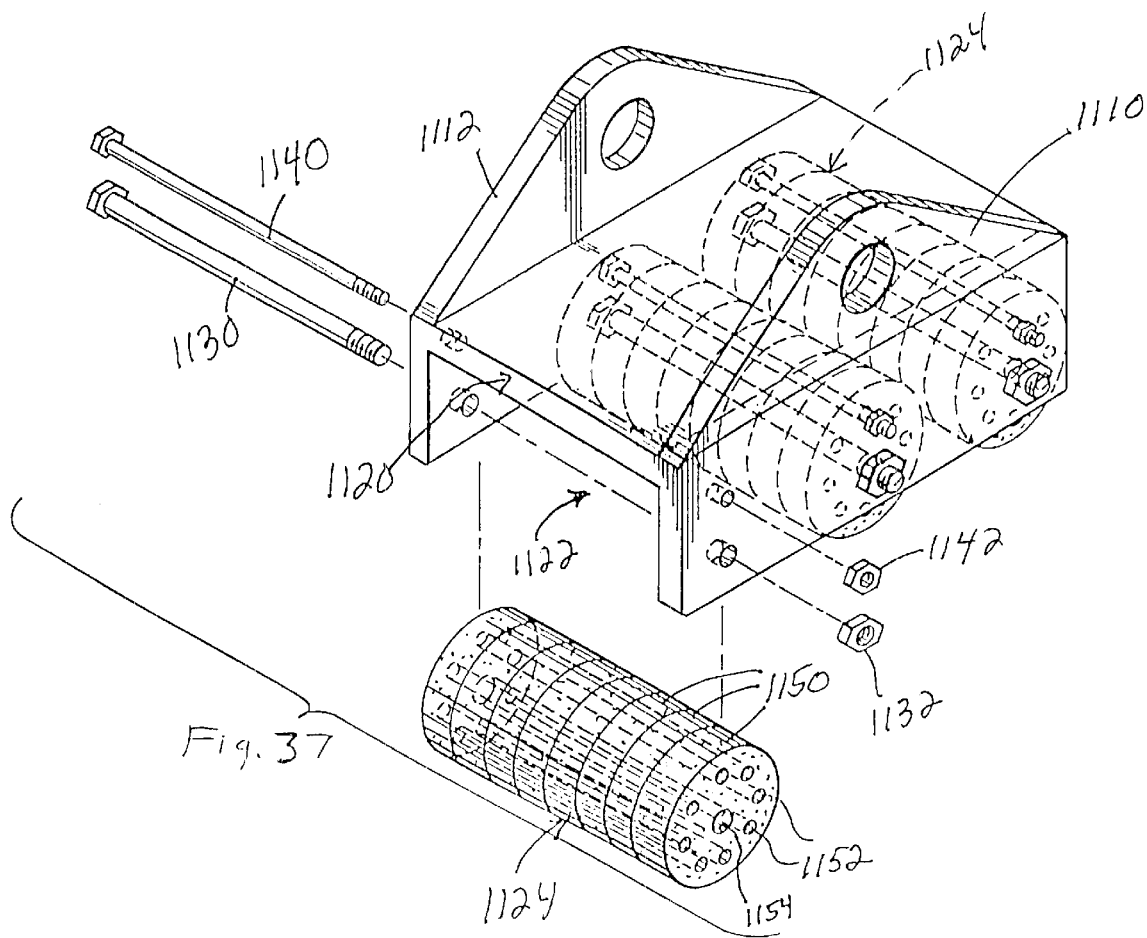
FIG. 37 is an exploded perspective view of the embodiment of FIG. 36.

Reference is now made to FIGS. 36 and 37 for a further version of the present invention. This particular pad construction is not meant to be reversible itself and thus is not illustrated with any grouser points. However, this version is comprised of spaced apart plate members 1110 and 1112. These plate members are supported from the stabilizer arm 1114 by means of pin 1116. This version of the invention also includes an interconnecting face plate 1120 forming a pocket 1122 for receiving a plurality of resilient pads 1124. The pads 1124 are supported in substantially the same manner as illustrated in the embodiment of FIGS. 34 and 35. There is thus included a mounting member in the form of a securing bolt 1130 and associated nut 1132. There is also provided the registration bolt 1140 and associated nut 1142. Refer in particular to FIG. 37 that shows the bolts 1130 and 1140 and their associated respective nuts 1132 and 1142.

In the embodiment of FIGS. 36 and 37, the primary difference between this embodiment and the embodiment of FIGS. 34 and 35 is that each of the resilient pads 1124 are comprised of separate pad segments 1150. Each of the resilient pads is also provided with the through holes 1152 for receiving the registration bolt 1140 as well as the centrally disposed hole 1154 for receiving the mounting member support bolt 1130.

In both the embodiment of FIGS. 34 and 35, as well as the embodiment of FIGS. 36 and 37, it is noted that there is provided a separate indexing bolt or the like for maintaining the resilient pad in a selected position. However, in the embodiment of FIGS. 38 and 39, the mounting member itself provides for the registration between the resilient pad and the support thereof. This simplifies the construction.

Figure 38:
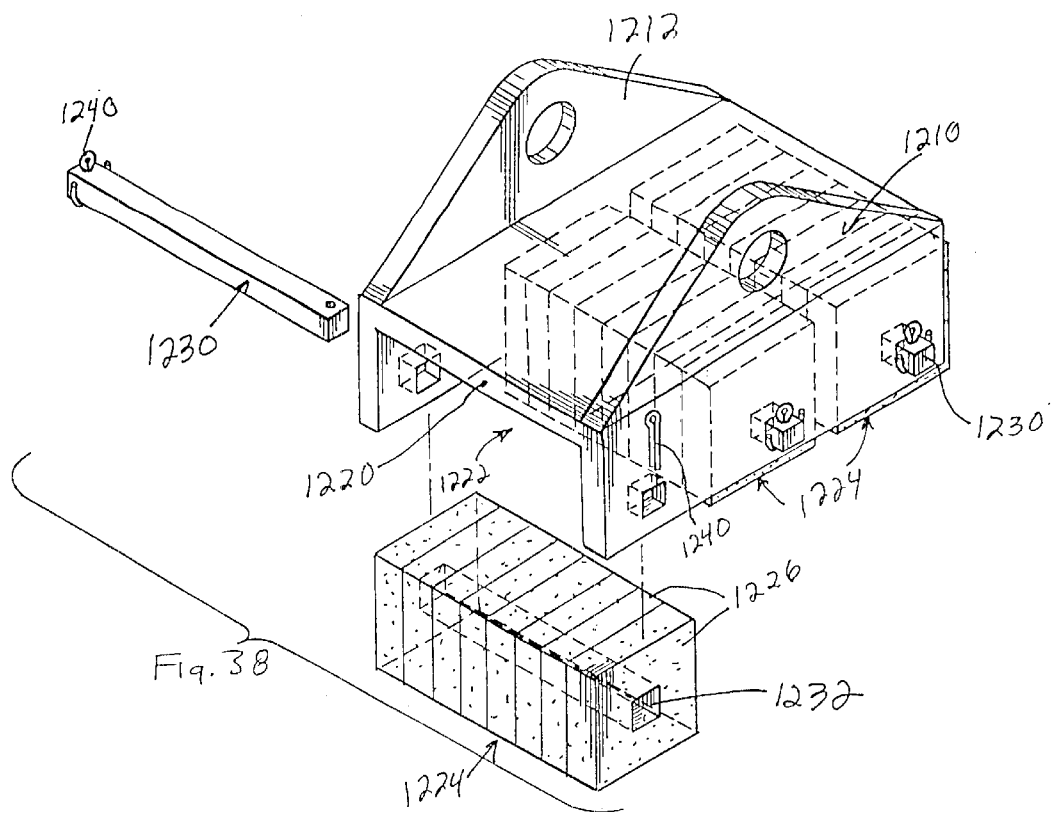
FIG. 38 is a perspective view of still a further embodiment of the present invention.

Now, with regard to FIG. 38, there is shown a stabilizer pad that includes plate members 1210 and 1212 and an interconnecting base plate 1220 forming a pocket 1222 in which are disposed a plurality of resilient pads 1224. In the embodiment of FIG. 38 each of the pads 1224 is of square cross-section and is comprised of a plurality of stacked side-by-side pad segments 1226. Of course, each of the pads could also be of solid construction, such as the solid construction of FIG. 34. Also, rather than being of square cross-section in FIG. 38, the outer periphery of the resilient pad could be of cylindrical construction such as illustrated in FIG. 34.

The mounting member for each resilient pad is a mounting shaft 1230 of substantially square or rectangular cross-section matching that of the passage 1232 centrally disposed within the resilient pad 1224. This arrangement provides an interlock Is between the shaft 1230 and the resilient pad 1224, without the use of a separate indexing and securing member. Opposite ends of the mounting shaft 1230 may be secured by means of cotter pins 1240.

In the embodiment of FIG. 38, when the surface facing the ground has worn sufficiently, then the mounting shaft 1230 may be disengaged from the plate members. The resilient pad 1224 may then be rotated through, say 90° and the mounting shaft 1230 may then be reengaged with the resilient pad to reposition the resilient pad so that a new working surface is facing the ground. The stacked segments 1226 of the pad 1224 may be secured together by an adhesive.

Figure 39:
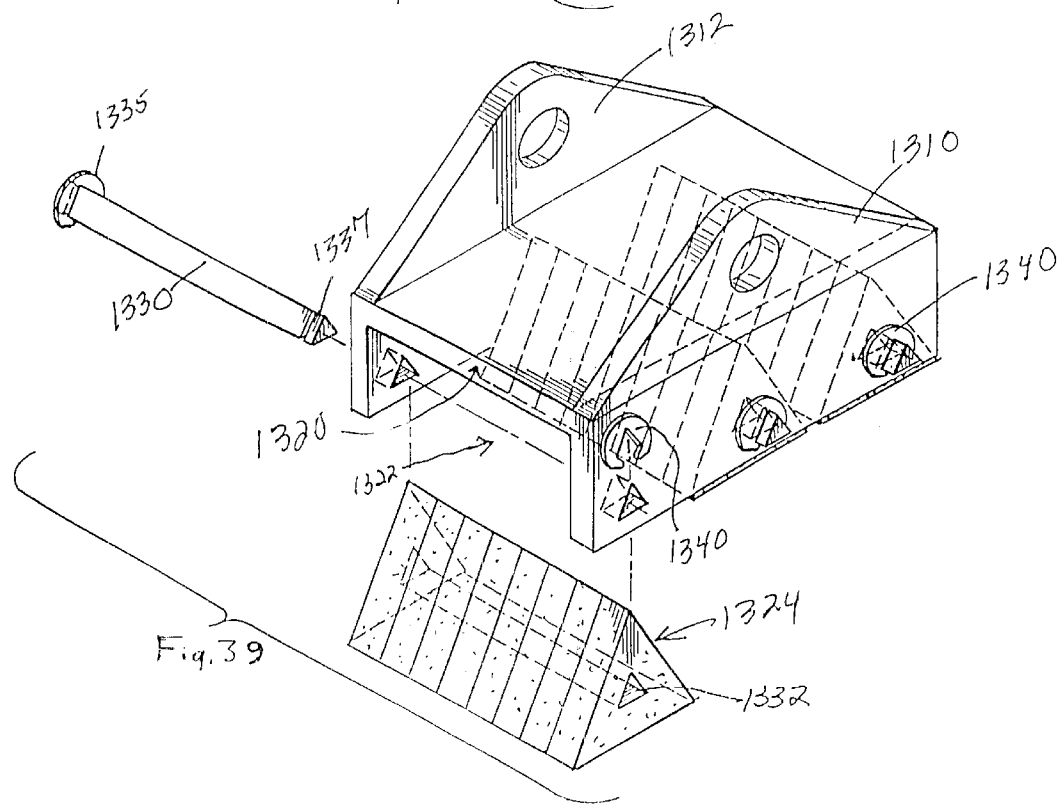
FIG. 39 is a perspective view of yet another embodiment in accordance with the present invention.

FIG. 39 describes a pad construction this is quite similar to that depicted in FIG. 38. FIG. 39 describes plate members 1310 and 1312 and interconnecting base plate 1320 forming pocket 1322. Also described are triangular shaped resilient pads 1324 having a triangular shaped center passage 1332. Although a triangular outer configuration is shown for the resilient pad 1324, it is understood that other configurations may be used such as a square configuration in combination with a triangular center passage 1332.

FIG. 39 also illustrates the mounting member in the form of a triangular cross-section shaft 1330 having at one end a head 1335 and at the other end a slot 1337 that is adapted to received retaining clip 1340. As with the embodiment of FIG. 38, this embodiment illustrated in FIG. 39, also does not require any separate registration bolt. The registration occurs with the dual function use of the shaft 1330 that first, provides a support for the resilient pad 1324 and second, provides a means of registration to lock the resilient pad 1324 in one of a number of different ground engaging positions. With a triangular construction as illustrated in FIG. 39, there are, of course, three ground engaging positions that can be attained. Also, in FIG. 39 there is illustrated a multi-segment resilient pad 1324. In another embodiment of the present invention there could be provided a solid one-piece resilient pad.

Reference is now made to the perspective view of FIG. 40 and the cross-sectional views of FIGS. 41 and 42. This construction is similar to that described previously in connection with FIGS. 26 and 27. In this regard, there are provided laterally spaced apart plate members 1410 and 1412 that may be interconnected by piece 1416. On one side of each of the plate members there may be provided respective grouser points 1411 and is 1413. In this embodiment there are also provided a pair of mounting bars 1420, with a pair being associated with each of the plate members. These mounting bars 1420 may be welded or otherwise permanently secured to the outer facing sides of respective plate member 1410 and 1412. Refer to FIG. 41 and the weld at 1405.

Also illustrated in FIGS. 40–42 are the resilient pads 1430 which are illustrated as being comprised of separate pad segments 1435. The resilient pads are also provided with slots or passages of the same cross-sectional configuration as the mounting members or mounting bars 1420. Also provided is a clamp bar 1440 which is of somewhat elongated construction and extends along the elongated dimension of the resilient pad 1430. It is noted that the clamp bar 1440 has a somewhat curved or arcuate cross-section. This is desirable so as to provide a clamping force which is imposed primarily by the use of three bolts 1445 that are adapted to extend through holes in the clamping bar, through holes in the resilient pad and preferably also through holes in the plate member. A nut 1447 (see FIG. 42) may be provided on the other end of each of the bolts 1445.

In this particular embodiment, the mounting members or bars 1420 properly support and position the resilient pad. The bolts 1445 clamp the pad between the plate member, such as plate member 1410 and the clamp bar 1440. The mounting members 1420 prevent any pivoting or rotating of the resilient pad relative to its associated plate member. At the same time, the bolts 1445 and their associated nuts, secure the resilient pad and prevent the laminate sections 1435 from spreading particularly once the bolts are tightened.

Figure 43:
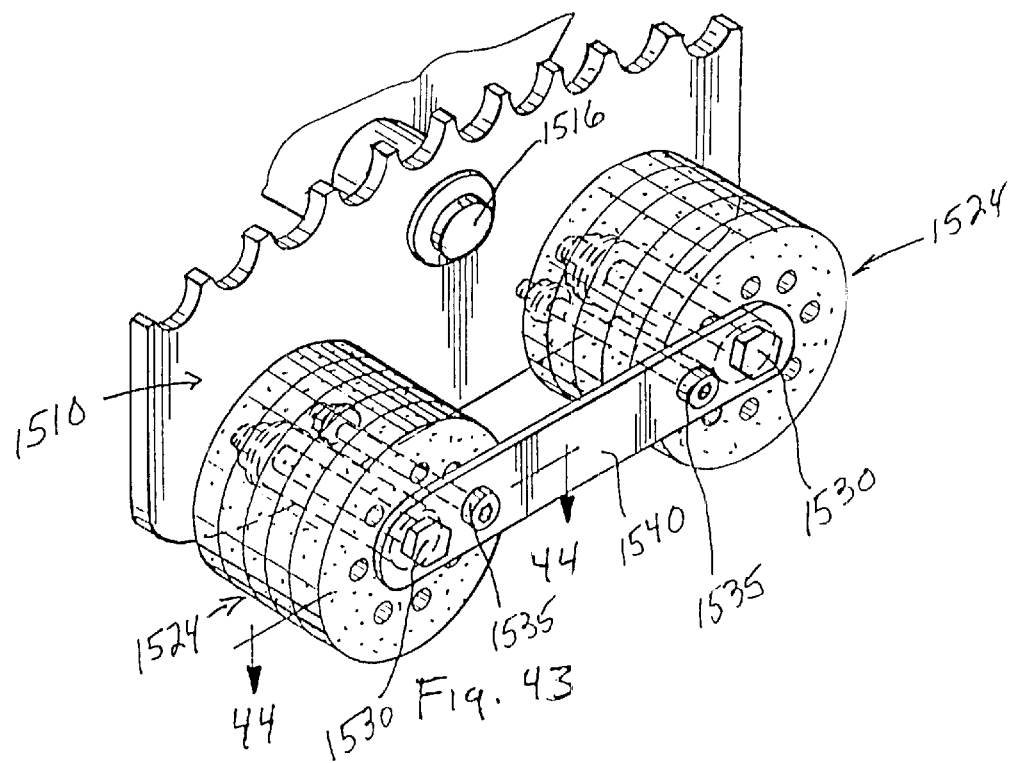
FIG. 43 is a perspective view of yet another embodiment of the present invention.
Figure 44:
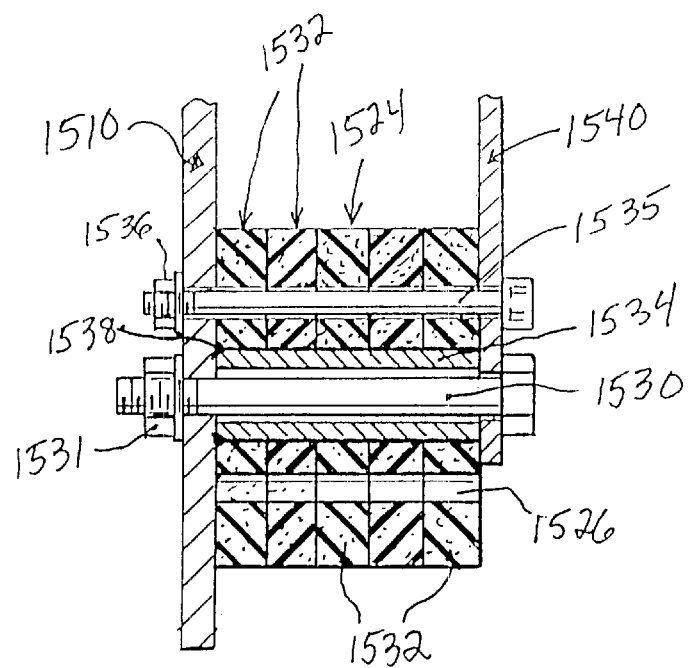
FIG. 44 is a cross-sectional view through the embodiment of FIG. 43, as taken along line 44—44 of FIG. 43.

FIG. 43 is a perspective view of still another embodiment of the present invention employing multiple resilient pads mounted outboard of the metal pad construction. FIG. 44 is a cross-sectional view taken along line 44—44 of FIG. 43, and showing further details of the construction.

For the sake of simplicity, only one of the plate members is illustrated. This is the plate number 1510. On the opposite side of the pad there is, of course, another plate member arranged in a manner similar to that illustrated, for example, FIG. 40. The plate member 1510 is supported from a pin 1516. A pair of mounting elements are provided. These are disclosed in this embodiment by means of bushings 1534 that are welded at 1538 to the plate member 1510. Refer to the cross-sectional view of FIG. 44 which shows the bushing 1534 welded at 1538.

FIGS. 43 and 44 also show two resilient pads 1524. Each of these pads is of circular cross-section and is comprised of multiple pad segments 1532. Of course, each of the resilient pads may also be of single piece construction. Each of the resilient pads has a centrally disposed hole of a diameter sufficient to fit over the bushing 1534. The resilient pads are also each provided with a plurality of outer circumferentially disposed holes 1526 that are adapted to receive the registration bolt 1535. Also disclosed is the main support bolt 1530 that extends through the bushing 1534 and is secured at the other side of the plate member 1510 by means of a nut 1531. There is also a nut 1536 associated with the registration bolt 1535.

Also disclosed in the embodiment of FIGS. 43 and 44 is link bar 1540 that is adapted to extend between the two resilient pads 1424. This bar 1540 has holes for receiving bolts 1530 as well as registration bolts 1535.

In FIGS. 43 and 44, the resilient pads are shown in a predetermined position with the bottom sides of the pads adapted for being in ground engagement. Once the pads wear on the ground engagement side, then the registration bolt 1535 may be withdrawn and each of the resilient pads may then be rotated through some predetermined angle, such as through 45° or 90° or more. The bolt 1535 is then reinserted into another one of the holes 1526 to hold the resilient pad in place and prevent any rotation thereof relative to the link bar 1540. In order to completely replace the resilient pads one needs to only remove bolts 1530 and 1535, along with the link bar 1540. Then, new pads can be slid on the bushings 1534 and the bolts 1530 and 1535 may then be reattached.

In the embodiment illustrated in FIGS. 43 and 44, it is understood that a similar construction to that depicted is also found on the other side of the metal pad construction. This would be analogous to supporting a pair of resilient pads on the opposite side of the metal construction, such as in a manner illustrated in FIG. 40 wherein pads are illustrated supported from both plate member 1410 and 1412. In the embodiment of FIGS. 43 and 44 only plate 1510 is illustrated, it being understood that another plate is provided on the opposite side with a pair of resilient pads extending outboard therefrom, in a manner similar to that illustrated in FIG. 40 but employing a pair of pads rather than the single pad construction illustrated in FIG. 40.

Figure 45:
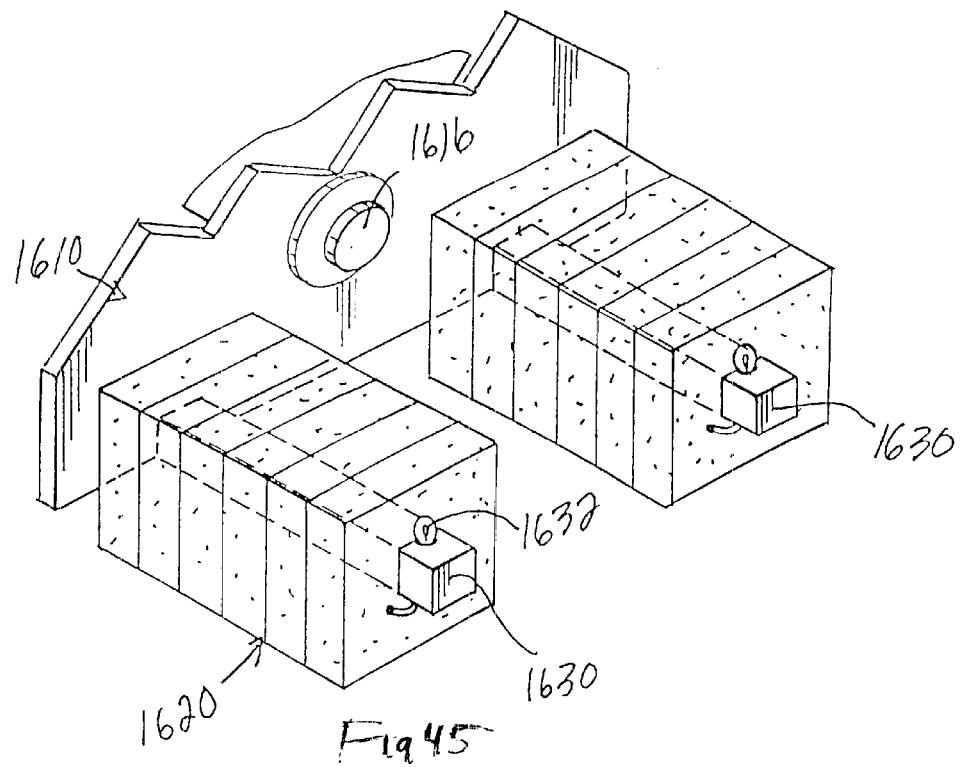
FIG. 45 is a perspective view of still another version of the present invention.

Reference is now made to FIG. 45 which is a further simplified perspective view showing still a further embodiment of the present invention. This illustrates one of two plate members supported from pin 1616. The plate member 1610 also carries a pair of mounting members 1630 that is secured to plate 1610 in an appropriate manner such as by being bolted thereto or by being welded to the plate. These mounting members 1630 mount the resilient pad 1620 in an outboard manner, similar to that illustrated in FIGS. 43 and 44. However, in the embodiment of FIG. 45, the registration pin is not used as the mounting member 1630 itself forms the mount for the resilient pad 1620 as well as the means for registering the pad 1620 in one of a plurality of different rotational positions. In FIG. 45 the pad 1620 is a multi-segment pad and is secured by means of a cotter pin 1632. In the embodiment of FIG. 45 each of the resilient pads is of square cross-section. In alternate embodiments of the invention the outer surface of the pad may be circular while the hole may be square, triangular or of some other multi-sided configuration.

Figure 46:
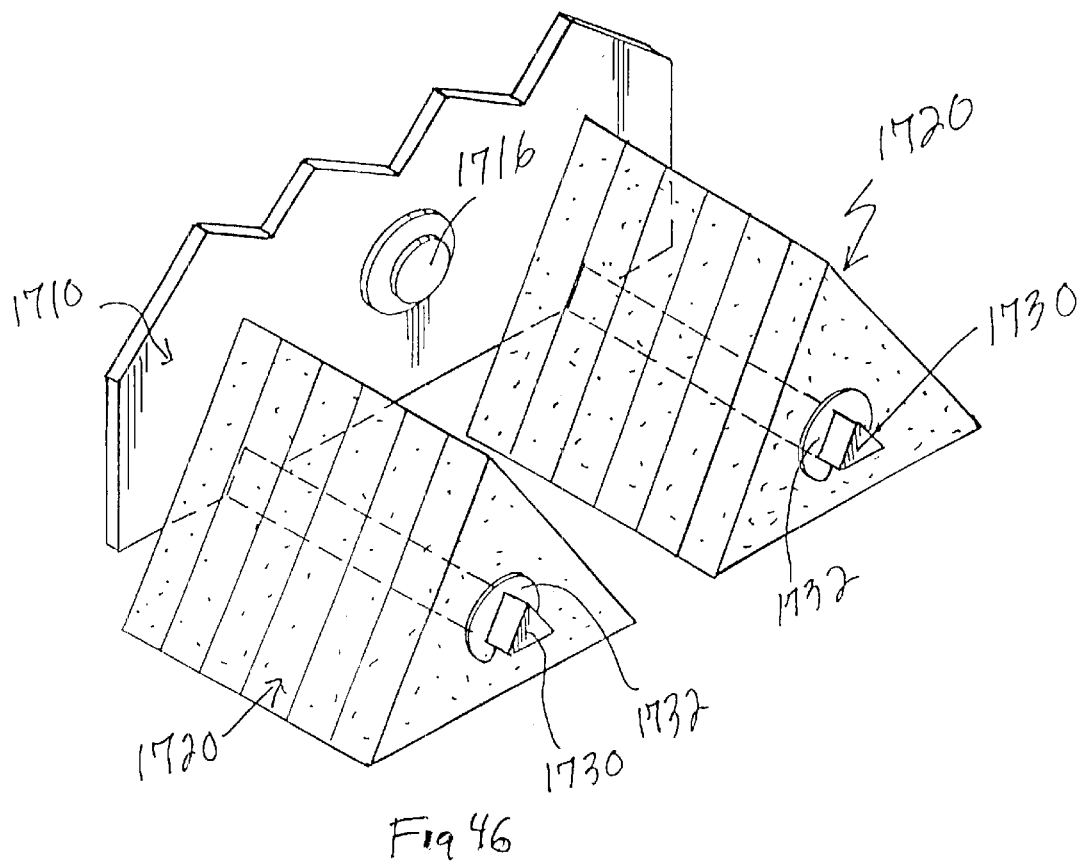
FIG. 46 is a perspective view of yet another version in accordance with the present invention.

FIG. 46 illustrates still a further embodiment of the present invention in which the plate member 1710 is supported from a pin 1716. The plate 1710 carries mounting members 1730 of triangular cross-section. In FIG. 46 there are also illustrated the resilient pads 1720 each of which is of multi-segment construction. In an alternate embodiment of the invention each of these pads may be of solid construction. The mounting member 1750 which is of triangular cross-section, may be used for supporting its corresponding resilient pad but is also used as a means for registration between the pad and the support thereof. A retaining clip 1732 may be used for holding the resilient pad onto its mounting member 1730.

Reference is now made to another version of a latch that prevents self-flipping of the pad, such as illustrated in FIGS. 47-51. The stabilizer pad described therein includes laterally spaced apart plate members 1810 and 1812 that may be interconnected by piece 1816. On one side of each of the plate members there is provided a respective grouser points 1811 and 1813. In this particular embodiment, similar to that described in FIG. 40, there are also provided a pair of mounting bars 1820 which are most clearly illustrated in FIG. 51. There are a pair of such of mounting bars 1820 associated with each of the plate members 1810 and 1812. These mounting bars 1820 may be welded or otherwise permanently secured to the outer facing sides of the respective plate members 1810 and 1812.

Figure 47:
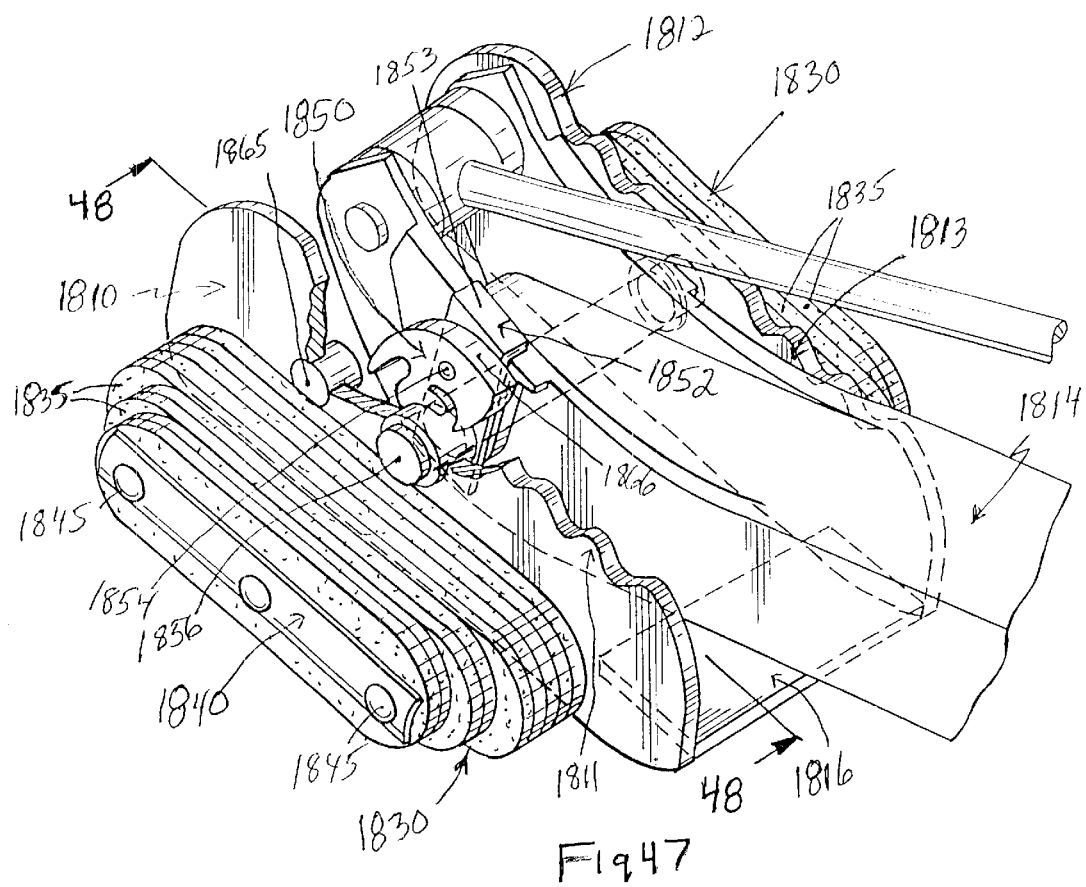
FIG. 47 is a perspective view of a further embodiment of the present invention showing another form of a releasable latch.
Figure 48:
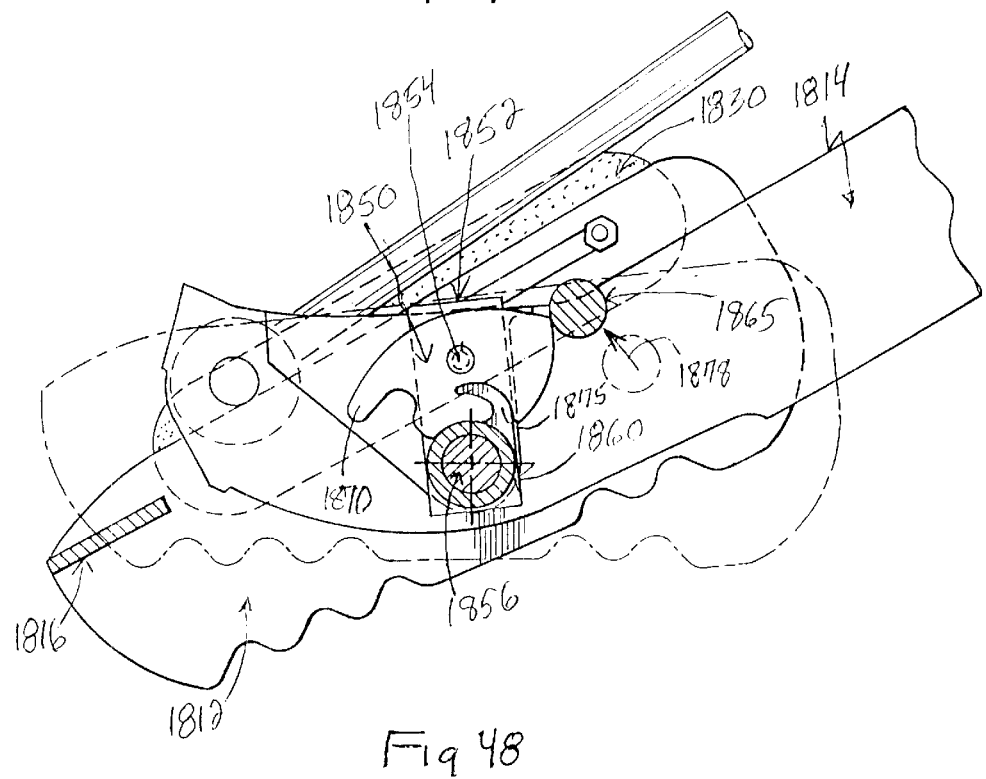
FIG. 48 is a cross-sectional view taken along line 48—48 of FIG. 47.

The stabilizer pad construction illustrated in FIGS. 47–51 also includes a set of resilient pads 1830. The perspective view of FIG. 47 shows the two oppositely disposed pads 1830. FIG. 48 also shows in the cross-sectional view one of the resilient pads 1830. Each of the resilient pads 1830 is comprised of separate pad layers 1835. In the particular configuration of FIG. 47 the pads 1830 have their layers grouped in three separate groups by size including a smaller size consisting of two layers on the outer side of the pad, an intermediate size set of two layers and an inner set of five larger length layers. This configuration of pad layers is advantageous with it providing essentially a taper at either end of the elongated pads. This makes for a firmer contact with the ground surface when in the pad engaging position of the stabilizer pad.

Each of the layers of the respective pads are provided with slots or passages that are of the same cross-sectional configuration as the mounting members or mounting bars 1820. Also provided is a clamp bar 1840 depicted in FIG. 47. The clamp bar 1840 is of somewhat elongated construction and extends along the elongated dimension of the resilient pad 1830. The clamp bar 1840 may have a somewhat curved or arcuate cross-section. This is desirable so as to provide a clamping force which is imposed primarily by the use of the three bolts 1845 that are adapted to extend through holes in the clamp bar, through holes in the resilient pad and preferably also through holes in the corresponding plate member. A nut may be provided on the other end of each of the bolts 1845.

In the embodiment of FIGS. 47–51, the illustration is primarily of an improved latch construction. Accordingly, different forms of resilient pads may be suitably adapted to the sides of the plate members including different forms of mounting and securing of the resilient pads.

In this particular embodiment, the mounting members or bars 1820 properly support and position the resilient pad. The bolts 1845 clamp the pad between the plate member, such as plate member 1810 and the clamp bar 1840. The mounting members 1820 prevent any pivoting or rotating of the resilient pad relative to its associated plate member. At the same time, the bolts 1 845 and their associated nuts, secure the resilient pad and prevent the laminate sections 1835 from spreading particularly once the bolts are tightened.

Figure 49:
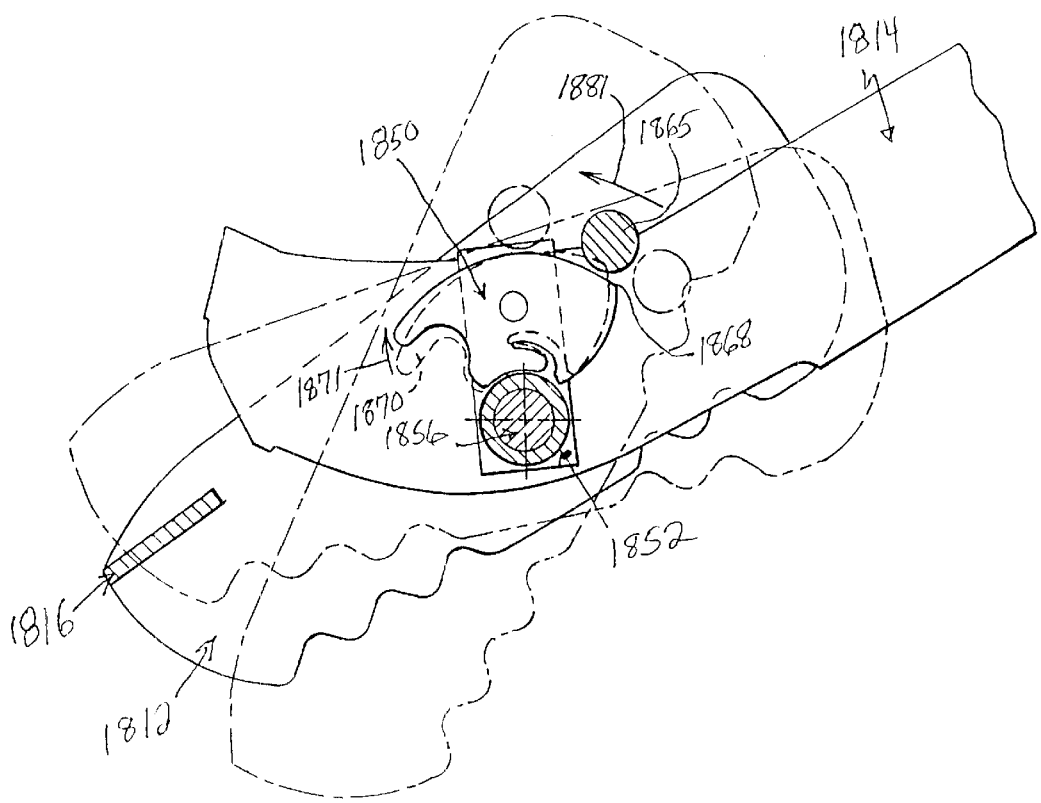
FIG. 49 is some-what schematic side view similar to that depicted in FIG. 48 but with the pad released to rotate counter clockwise.
Figure 50:
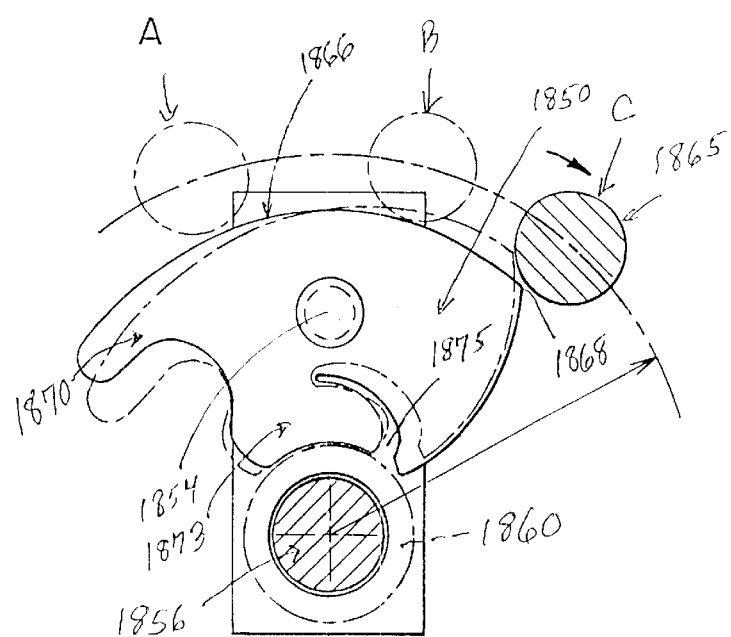
FIG. 50 is an enlarged detailed view of the latch of FIG. 49 showing clockwise motion of the pad.
Figure 51:
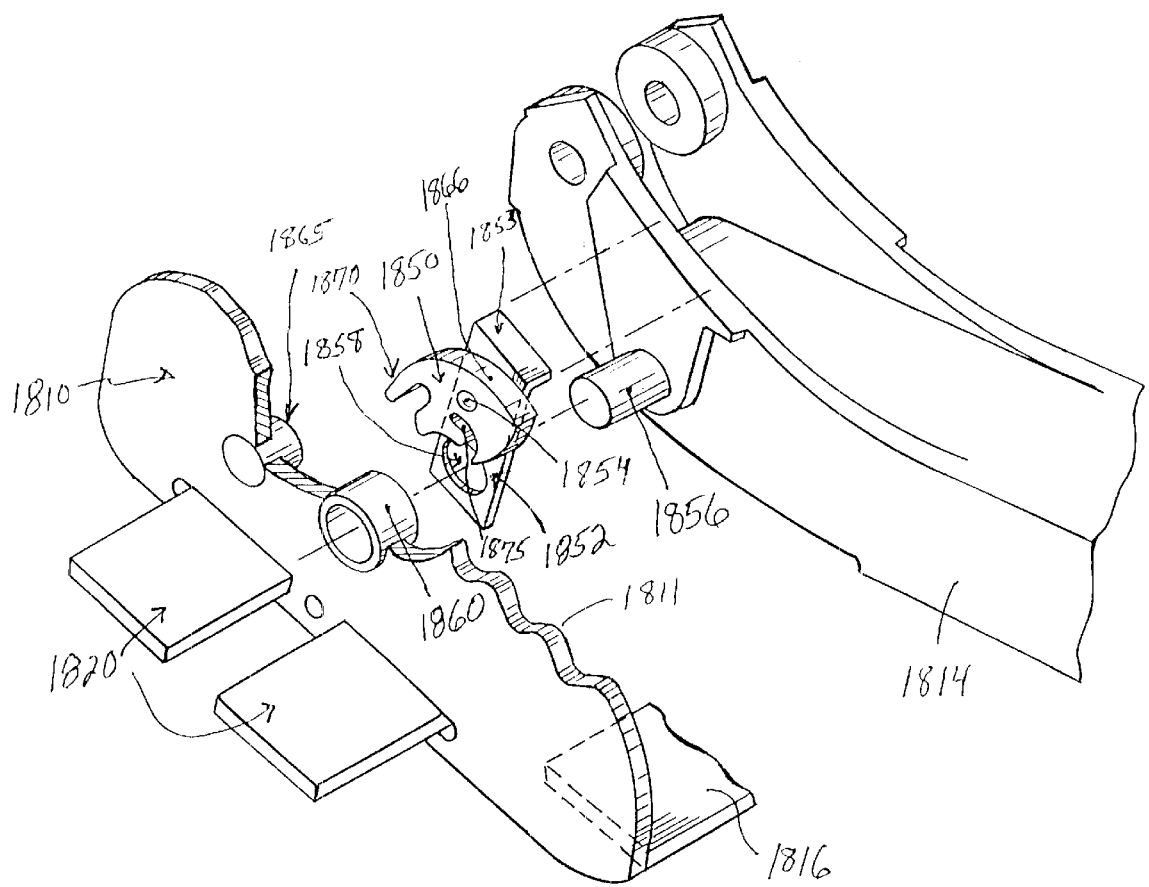
FIG. 51 is an exploded perspective view showing the components of the latch illustrated in FIGS. 47–50.

Now, in FIGS. 47–51, there is also provided a latch device that is employed for preventing self-flipping of the stabilizer pad relative to the stabilizer arm 1814. The latch device includes a latch that is constructed and arranged to have a pivot that enables limited rotation thereof. This is illustrated in the drawings by the latch 1850. The latch 1850 includes a latch holder that has the latch pivoted therefrom. The latch holder is disposed between the latch and the stabilizer arm. This is illustrated in the drawings by the latch arm 1852. The latch 1850 is pivotally supported from the latch arm 1852 by means of a rivet 1854. The top lip 1853 of the latch arm 1852 is supported on the arm 1814, as noted in FIG. 47. This engagement with the arm 1814 prevents any sideward rotation of the latch arm 1852. Latch arm 1852 also fits over the stabilizer arm pin 1856. For this purpose, there is provided a hole 1858 in the bottom end of the latch arm 1852. FIG. 51 shows an exploded view of these latch components. For the purpose of supporting the latch, there is also provided a bushing 1860 supported by the plate member 1810, as viewed in FIG. 51.

The latch, construction also includes a stop-cam that is selectively adapted for engagement with the latch. This is illustrated in the drawings by the stop-cam 1865. The stop-cam 1865 is for engagement with the latch 1850 to be described in further detail hereinafter. The stop-cam 1865 is suitably fixed to the plate member and essentially rotates with the plate member that it is attached to.

The latch 1850 has a cam-like ramp surface 1866 on the top thereof terminating at one end in edge 1868 and at the other end in handle 1870. It is the edge 1868 that is adapted to engage with the stop-cam 1865 as will be described in further detail hereinafter.

The latch 1850 also includes a foot 1873 defining adjacent thereto an elongated slot 1875 that enables the foot 1873 to deflect. This enables partial rotation of the latch about its pivot at the rivet 1854.

In FIG. 47 the stabilizer pad is shown with the resilient pad in a ground engaging position and with the grouser points out of ground engaging position. In that position it is noted that the latch 1850 is not at all engaging with the stop-pin 1865 and thus in that position the latch is essentially inactive. As there is little likelihood of self-flipping from the resilient pad position, there is no need to form any type of latch or lock in that position.

FIG. 48 illustrates the latch 1850 with the pad in dotted outline having its grouser point side engaging the ground. FIG. 48 also shows in solid outline the pad being rotated counter-clockwise, however, the stop-cam or pin 1865 engages with the edge 1868 of the latch 1850 and further counter-clockwise rotation of the pad is prevented. This illustrates the latch being in its operable position to prevent self-flipping of the pad, or in other words movement of the pad inadvertently from a position wherein the grouser points engage the ground to a position wherein the resilient pad would engage the ground. This counter-clockwise rotation of the flip pad is illustrated by the movement directed by arrow 1878 in FIG. 48. In that position it is noted that the slot 1875 is at its normal position and that the foot 1873 of the latch 1850 is resting upon the bushing 1860.

As indicated previously, in FIG. 48 the stabilizer pad is illustrated with its grouser points in a ground engaging position. To move the stabilizer pad to a position wherein the resilient pad is engaging the surface, then the stabilizer pad is rotated counter-clockwise. To unlatch the latch 1850 from the stop-cam 1865, the handle 1870 is lifted as illustrated in FIG. 49 by the arrow 1871. In FIG. 49 the handle 1870 is shown in its normal position in dotted outline and in its lifted position in solid outline. This causes a pivoting of the latch 1850 and corresponding compression of the latch foot 1873. This action essentially closes the slot 1875 and tilts the edge 1868 down sufficiently so that the latch can clear the stop-cam 1865. The stop-cam 1865 illustrated in solid outline in FIG. 49 shows that this clearance has occurred and then the stabilizer pad can be rotated counter-clockwise as illustrated by the arrow 1881. Continued rotation of the stabilizer pad will then place the resilient pad surface in ground engaging position.

FIG. 50 also illustrates the transition of the stabilizer pad from a position wherein the resilient pad is in ground engaging surface to a position wherein the grouser points are in ground en aging surface. In FIG. 50 the stop-cam 1865 is shown in dotted outline two positions and in solid outline in a final position. In position A the stop-pin or stop-cam is free to rotate clockwise as the stabilizer pad rotates clockwise. This action occurs without having to release the latch. At position B the stop-pin or stop-cam is illustrated contacting the ramp 1866. This contact pushes down on the ramp so as to press the latch with the primary compression occurring at the foot 1873. Position C in FIG. 50 illustrates the stop-pin passing over the edge 1868 thus releasing the ramp so that the latch springs back into position as shown in dotted outline in FIG. 50 and thus preventing further counter-clockwise rotation of the stop-pin. This is also the position that is illustrated in FIG. 48.

To summarize, when the stabilizer pad is in the position illustrated in FIG. 47 with the resilient pad in a ground engaging position, and it is desired to move the grouser points into ground engagement, then the pad is rotated clockwise. The operator simply rotates the pad and the latch swings clear as the stop-cam rides on the cam surface of the latch. This is the action illustrated in FIGS. 48 and 50. This action concludes by the stop-cam passing over the end of the latch and the latch springing back into position to lock against the stop-pin and prevent any reverse counter-clockwise rotation. When it is desired to move the pad in a counter-clockwise direction so as to put the resilient pad back into a ground engaging position, then the handle 1870 is simply lifted and the stabilizer pad can then be rotated in the manner illustrated in FIG. 49.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A stabilizer pad assembly for use with a stabilizer arm, the stabilizer pad assembly comprising:
   a pair of laterally spaced apart plate members, the pair of plate members being pivotally attached to a stabilizer arm by a pin extending laterally between facing surfaces of respective plate members;
   at least one resilient pad formed with multiple interconnected peripheral surfaces, any one of which may be a ground engaging surface, and with at least one passage extending transversely therethrough between opposite sides of said resilient pad, said multiple peripheral surfaces extending about said passage; and
   at least one mounting member extending through the at least one passage in said resilient pad and being releasably and non-rotatably connected to said pair of laterally spaced apart plate members, said resilient pad passage and said mounting member having mating non-circular cross-sections for preventing relative rotation therebetween;
   said mounting member being removably engageable within said passage in said resilient pad so as to permit selective rotational positioning of any one of said multiple peripheral surfaces to a ground engaging orientation for use as the ground engaging surface;
   wherein said mounting member provides support for said resilient pad, and the mating non-circular cross-sections of said mounting member and resilient pad passage provide for non-rotational registration therebetween.

2. A stabilizer pad assembly as in claim 1 including a plurality of separate resilient pads and a like plurality of mounting members.

3. A stabilizer pad assembly as in claim 2 wherein the mounting members position the resilient pads with opposite ends thereof disposed between the pair of plate members.

4. A stabilizer pad assembly as in claim 3 wherein the mounting members position the resilient pads spaced one from the other.

5. A stabilizer pad assembly as in claim 4 wherein each mounting member comprises a shaft.

6. A stabilizer pad assembly as in claim 5 wherein all shafts are disposed in parallel.

7. A stabilizer pad assembly as in claim 1 wherein each resilient pad is of cylindrical shape.

8. A stabilizer pad assembly as in claim 7 wherein said mounting member extends through a passage at substantially the center axis of the cylindrical resilient pad.

9. A stabilizer pad assembly as in claim 1 wherein said mounting member is of square cross-section.

10. A stabilizer pad assembly as in claim 1 wherein said mounting member is of triangular cross-section.

11. A stabilizer pad assembly as in claim 1 wherein the resilient pad has a square cross-section.

12. A stabilizer pad assembly as in claim 1 wherein the resilient pad has a triangular cross-section.

13. A stabilizer pad assembly as in claim 1 wherein each resilient pad comprises multiple stacked pad segments.

14. A stabilizer pad assembly as in claim 1 including a base plate interconnecting the spaced apart plate members and disposed between the pin and the resilient pad.

15. A stabilizer pad assembly as in claim 14 wherein the base plate and parts of the plate members form a pocket for receiving multiple resilient pads.

16. A stabilizer pad assembly as in claim 1 wherein each plate member also has grouser points.

17. A stabilizer pad assembly as in claim 1 wherein the cross-sectional shape of the resilient pad is substantially the same as the cross-sectional shape of the pad passage.

18. A stabilizer pad assembly as in claim 2 wherein the mounting members are supported from respective plate members so as to dispose the resilient pads on the outer directed surfaces of plate members.

19. A stabilizer pad assembly for use with a stabilizer arm, the stabilizer pad assembly comprising:
   at least one plate member pivotally attached to a stabilizer arm by a pin extending laterally from said plate member;
   at least one resilient pad formed with multiple interconnected peripheral surfaces, any one of which may be a ground engaging surface, and with at least one passage extending transversely therethrough between opposite sides of said resilient pad, said multiple peripheral surfaces extending about said passage; and
   at least one mounting member non-rotatably attached to said plate member and extending outwardly therefrom, said mounting member extending through the at least one passage in said resilient pad, said resilient pad passage and said mounting member having mating non-circular cross-sections for preventing relative rotation therebetween, the mounting member being configured for retaining the resilient pad to the mounting member when mounted thereon,
   said mounting member and said passage in said resilient pad adapted for relative removable engagement therebetween so as to permit selective rotational positioning of any one of said multiple peripheral surfaces to a ground engaging orientation for use as the ground engaging surface;

wherein said mounting member provides support for said resilient pad, and the mating non-circular cross-sections of said mounting member and resilient pad passage provide for non-rotational registration therebetween.

20. A stabilizer pad assembly as in claim 19 including a plurality of separate resilient pads and a like plurality of mounting members.

21. A stabilizer pad assembly as in claim 20 including a pair of plate members, and wherein the mounting members position the resilient pads with opposite ends thereof disposed between the pair of plate members.

22. A stabilizer pad assembly as in claim 20 wherein the mounting members position the resilient pads spaced one from the other.

23. A stabilizer pad assembly as in claim 21 wherein said mounting member comprises a shaft that extends between spaced apart plate members.

24. A stabilizer pad assembly as in claim 19 wherein each resilient pad is of cylindrical shape.

25. A stabilizer pad assembly as in claim 19 wherein said mounting member extends through a passage at substantially the center axis of the cylindrical resilient pad.

26. A stabilizer pad assembly as in claim 19 wherein said mounting member is of square cross-section.

27. A stabilizer pad assembly as in claim 19 wherein said mounting member is of triangular cross-section.

28. A stabilizer pad assembly as in claim 19 wherein the resilient pad has a square cross-section.

29. A stabilizer pad assembly as in claim 19 wherein the resilient pad has a triangular cross-section.

30. A stabilizer pad assembly as in claim 19 wherein the resilient pad comprises multiple stacked pad segments.

31. A stabilizer pad assembly as in claim 19 wherein said mounting member comprises a shaft of multi-sided cross-section.

32. A stabilizer pad assembly as in claim 31 wherein said shaft has a triangular cross-section.

33. A stabilizer pad assembly as in claim 31 wherein said shaft has a square cross-section.

34. A stabilizer pad assembly as in claim 21 wherein the mounting members are supported from respective plate members so as to dispose the resilient pads on the outer directed surfaces of the plate members.

35. A stabilizer pad assembly as in claim 19 including a retainer removably engageable with said mounting member.

36. A stabilizer pad assembly as in claim 35 wherein said retainer comprises at least one of a clip and cotter pin.

37. A stabilizer pad assembly for use with a stabilizer arm, the stabilizer pad assembly comprising:

a pair of laterally spaced apart plate members, the pair of plate members being pivotally attached to a stabilizer arm by a pin extending laterally between facing surfaces of respective plate members;

at least one resilient pad formed with at least three multiple peripheral surfaces, and with a passage extending transversely therethrough between opposite sides of said resilient pad, said multiple peripheral surfaces extending circumferentially around said passage;

at least one mounting member extending through the at least one passage in said resilient pad, said resilient pad passage and said mounting member having like non-circular cross-sections with multiple peripheral surfaces equal in number to the multiple peripheral surfaces on said resilient pad, the at least one mounting member being removably and non-rotatably supported to the pair of plate members; and a retainer removably engageable with said mounting member, removable to permit said mounting member to be selectively removed from said passage in said resilient pad so as to permit selective positioning of any one of said multiple peripheral surfaces for use as a working surface for ground engagement.

38. A stabilizer pad assembly as in claim 37 wherein the mounting member also extends through a pair of aligned passages in said pair of laterally spaced apart plate members.

39. A stabilizer pad assembly as in claim 37 wherein the mounting member positions the resilient pad with opposite ends thereof disposed between the pair of plate members.

40. A stabilizer pad assembly as in claim 37 wherein the mounting members are supported from respective plate members so as to dispose the resilient pads on the outer directed surfaces of the plate members.

41. A stabilizer pad assembly for use with a stabilizer arm, the stabilizer pad assembly comprising:

a pair of laterally spaced apart plate members, the pair of plate members being pivotally attached to a stabilizer arm by a pin extending laterally between facing surfaces of respective plate members;

at least one resilient pad formed with at least three multiple peripheral surfaces, any one of which may be a ground engaging surface, and with at least one passage extending transversely therethrough between opposite sides of said resilient pad, said multiple peripheral surfaces extending about said passage; and at least one mounting member extending through the at least one passage in said resilient pad and through a pair of aligned passages in said pair of laterally spaced apart plate members, said resilient pad passage, said mounting member, and said pair of aligned plate member passages all having mating non-circular cross-sections for preventing relative rotation therebetween;

said mounting member being removably engageable with said passage in said resilient pad and said pair of aligned plate member so as to permit selective rotational positioning of any one of said multiple peripheral surfaces for use as the ground engaging surface;

wherein said mounting member provides support for said resilient pad, and the mating non-circular cross-sections of said mounting member and resilient pad passage provide for rotational registration therebetween.

42. A stabilizer pad assembly as in claim 41 wherein said mounting member, in an engaged position, supports said resilient pad in a position relative to the plate members so that any one of said multiple peripheral surfaces may be in ground engagement, and, in a disengaged position, removeable so as to permit selective rotational positioning of another of said multiple peripheral surfaces into a ground engaging position.

43. A stabilizer pad assembly as in claim 41 wherein the mounting member positions the resilient pad with opposite ends thereof disposed between the pair of plate members.

44. A stabilizer pad assembly as in claim 41, wherein the mounting members are supported from respective plate members so as to dispose the resilient pads on the outer directed surfaces of the plate members.

\* \* \* \* \*